United States Patent
Song et al.

(10) Patent No.: US 12,450,253 B2
(45) Date of Patent: Oct. 21, 2025

(54) DATA FLOW CONTROLLER FOR DATA REPLICATION IN AN ONLINE CONTENT SERVING SYSTEM

(71) Applicant: Google LLC, Mountain View, CA (US)

(72) Inventors: Bin Song, Fremont, CA (US); Dani Suleman, Fremont, CA (US); Kiran Kumar Gunda, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/013,387

(22) PCT Filed: Dec. 20, 2022

(86) PCT No.: PCT/US2022/053444
§ 371 (c)(1),
(2) Date: Dec. 28, 2022

(87) PCT Pub. No.: WO2024/136841
PCT Pub. Date: Jun. 27, 2024

(65) Prior Publication Data
US 2025/0124049 A1    Apr. 17, 2025

(51) Int. Cl.
*G06F 16/27* (2019.01)
(52) U.S. Cl.
CPC ................. *G06F 16/27* (2019.01)
(58) Field of Classification Search
CPC ..................................................... G06F 16/27
See application file for complete search history.

(56) References Cited

U.S. PATENT DOCUMENTS 11,741,078 B1 *  8/2023  Narendra ............ G06F 16/2358
                                                          707/690
2010/0318495 A1 * 12/2010  Yan .......................... G06F 16/27
                                                          707/618

(Continued)

OTHER PUBLICATIONS

International Search Report and Written Opinion for PCT/US2022/053444, mailed on Jun. 29, 2023, 13 pages.

(Continued)

*Primary Examiner* — Tyler J Torgrimson
(74) *Attorney, Agent, or Firm* — DORITY & MANNING P.A.

(57) ABSTRACT

Techniques for generating replication data from a data source to be stored in a target location are described herein. A computing system can receive, from a client device, client requirements associated with a dataflow from the data source to the target location. The client requirements can include an expected data freshness value and an expected data query latency value. Additionally, the computing system can process the expected data freshness value with one or more machine-learned models to generate an extraction framework for extracting data from the data source. Moreover, the computing system can process the expected data query latency value with the one or more machine-learned models to generate a loading framework for loading data to the target location. Furthermore, the computing system can copy the replication data from the data source to the target location based on the extraction framework and the loading framework.

21 Claims, 19 Drawing Sheets

(56) References Cited

U.S. PATENT DOCUMENTS

| | | | |
|---|---|---|---|
| 2012/0215740 A1* | 8/2012 | Vaillant | G06F 16/273 |
| | | | 707/634 |
| 2017/0262524 A1* | 9/2017 | Cho | G06F 16/278 |
| 2018/0121099 A1* | 5/2018 | Vaquero Gonzalez | |
| | | | G06F 16/27 |
| 2021/0034571 A1 | 2/2021 | Bedadala et al. | |
| 2021/0042292 A1* | 2/2021 | Gentric | G06F 16/2365 |
| 2021/0373770 A1* | 12/2021 | Nandan | G06F 3/067 |
| 2022/0382780 A1 | 12/2022 | Kumar et al. | |

OTHER PUBLICATIONS

International Preliminary Report on Patentability for Application No. PCT/US2022/053444, mailed Jul. 3, 2025, 9 pages.

\* cited by examiner

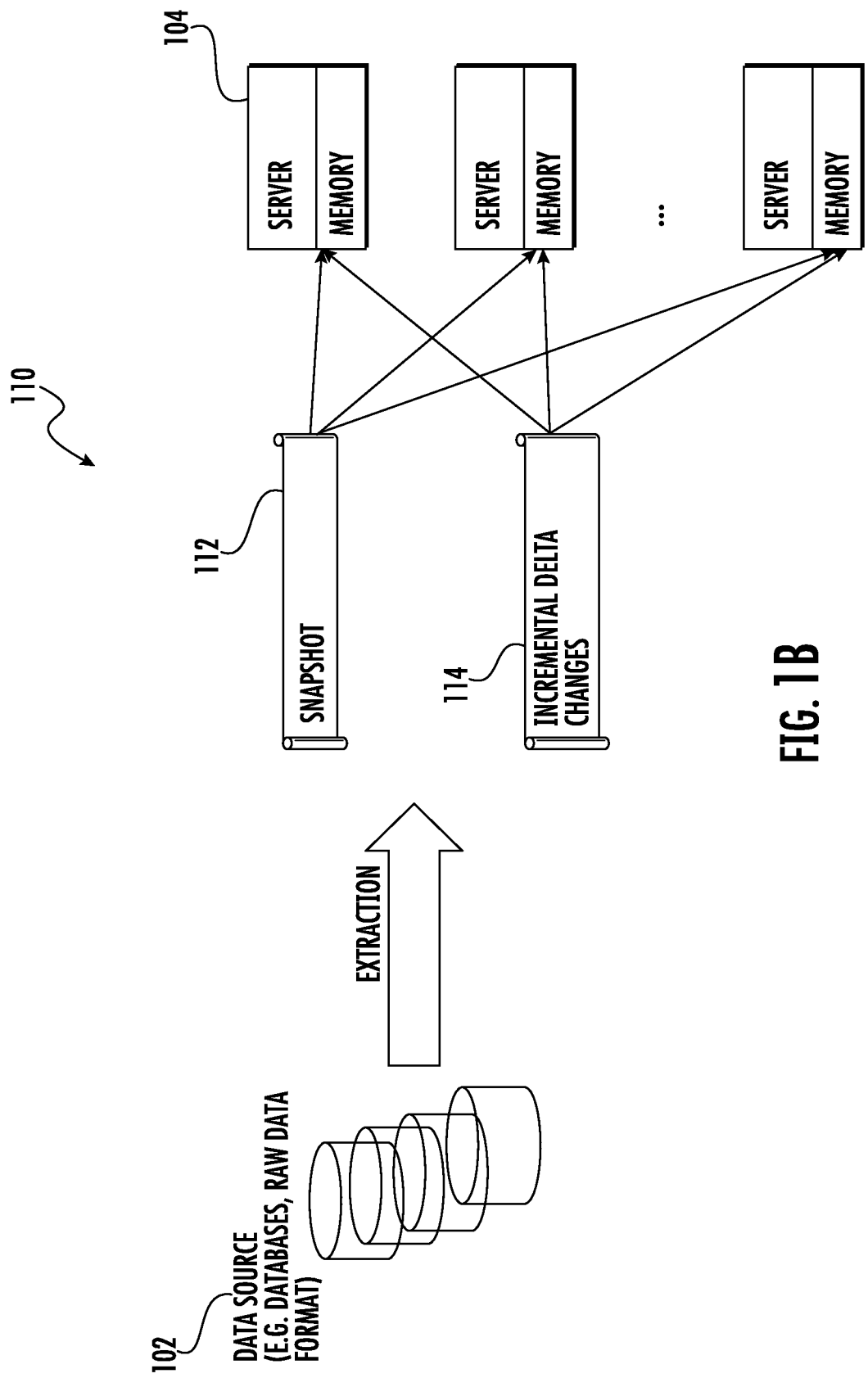

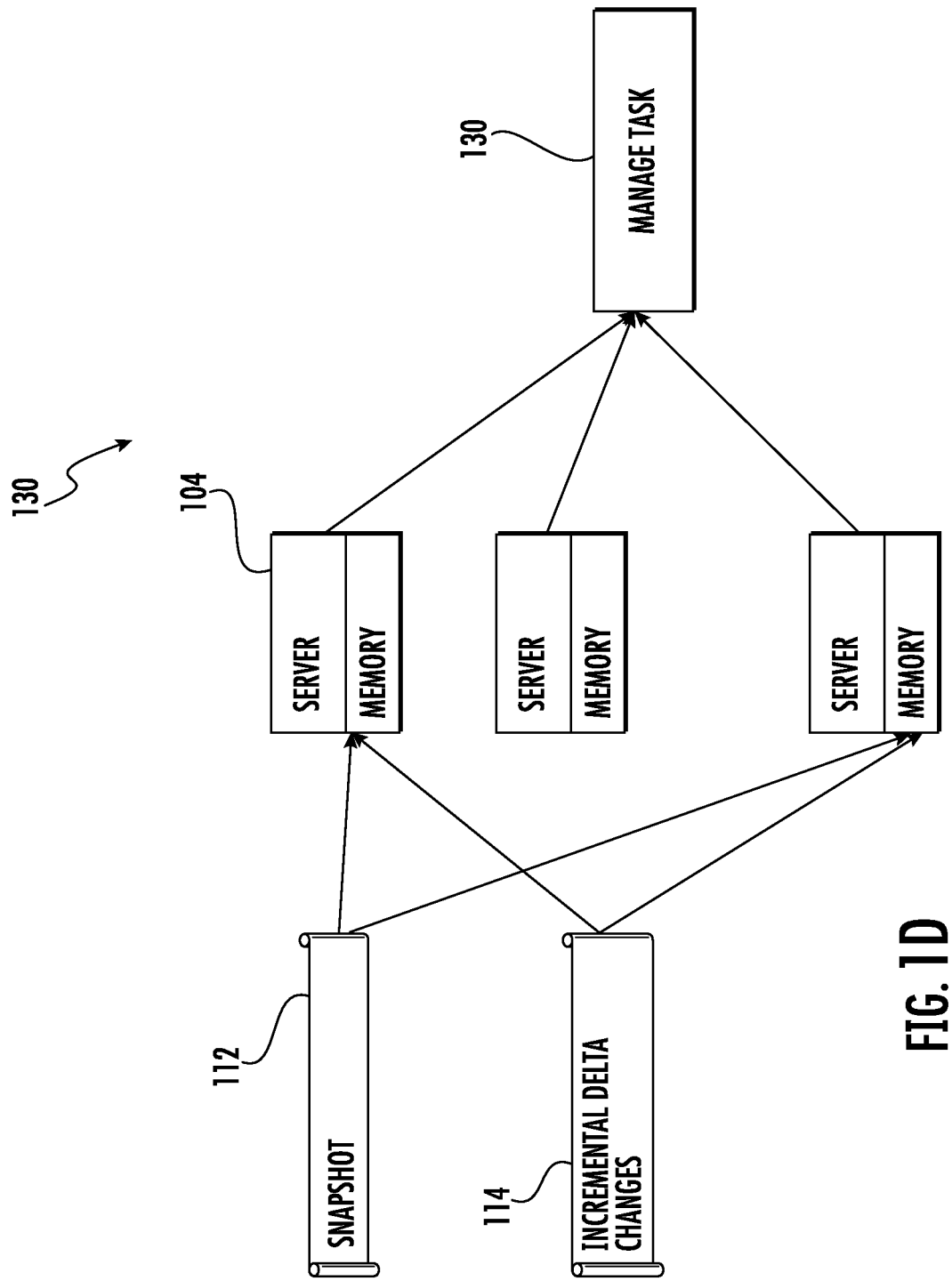

DATA FLOW CONTROLLER FOR DATA REPLICATION IN AN ONLINE CONTENT SERVING SYSTEM

CROSS-REFERENCE TO RELATED APPLICATIONS

The present application is based upon and claims the right of priority under 35 U.S.C. § 371 to International Application No. PCT/US2022/053444 filed on Nov. 20, 2022, which is incorporated by reference herein.

FIELD

The present disclosure relates generally to the field of improving database performance in an online ecosystem. More particularly, the present disclosure relates to reducing data query time and increasing data freshness for data replication in an online ecosystem.

BACKGROUND

Data replication is the process of storing the same data in multiple locations to improve data availability and accessibility, and to improve system resilience and reliability. Data replication involves writing or copying the same data to different locations. For example, having a replica can make data access faster, especially in organizations with a large number of locations. Putting a replica of the data closer to the user can improve access times and balance the network load. Replicated data can also improve and optimize server performance. When organizations run multiple replicas on multiple servers, users can access data faster.

Although data replication provides many benefits, the challenges to maintaining consistent data can be resource intensive. For example, keeping copies of the same data in multiple locations leads to higher storage and processor costs. Additionally, implementing and managing a data replication system requires dedicated time from an engineering team for setting up the data flow.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for generating replication data from a data source to be stored in a target location. The method can include receiving, from a client device, client requirements associated with a dataflow from the data source to the target location. The client requirements can have an expected data freshness value and an expected data query latency value. In some instances, the client requirements can include a query function and/or a number of queries per second value. Additionally, the method can include processing the expected data freshness value with one or more machine-learned models to generate an extraction framework for extracting data from the data source. Moreover, the method can include processing the expected data query latency value with the one or more machine-learned models to generate a loading framework for loading data to the target location. Furthermore, the method can include copying the replication data from the data source to the target location based on the extraction framework and the loading framework.

In some instances, the method can include accessing training data associated with a plurality of existing data flow setups. The one or more machine-learned models can be trained using the training data.

In some instances, where an extraction task is extracting data from the data store and a loading task is loading data to the target location, the method can further include determining a file interface between the extraction task and the loading task based on the extraction framework and the loading framework. Additionally, the file interface can be further determined based on a number of extraction tasks, a number of loading tasks, and a function associated with extracting data from the data source.

In some instances, the method can further include determining, using the one or more machine-learned model, a number of split data files. Additionally, the method can further include sharding the data being extracted from the data store into the number of split data files.

In some instances, the method can further include calculating a performance metric during the copying of the replication data. Additionally, the method can further include modifying a parameter in the extraction framework or a parameter in the loading metric to improve the performance metric.

In some instances, the method can further include calculating a minimum resource value for copying the replication data from the data source to the target location based on the extraction framework and the loading framework. Additionally, the method can include determining that the minimum resource value is below the available resource allocation. Moreover, the method can include transmitting a request to the client device to allocate additional resources based on the determination that the minimum resource value is below the available resource allocation.

Another example aspect of the present disclosure is directed to a computing system having one or more processors, and one or more non-transitory computer-readable media that collectively store instructions. The instructions, when executed by the one or more processors, cause the computing system to perform operations. The operations receiving, from a client device, client requirements associated with a dataflow from a data source to a target location, the client requirements having an expected data freshness value and an expected data query latency value; processing the expected data freshness value with one or more machine-learned models to generate an extraction framework for extracting data from the data source; processing the expected data query latency value with the one or more machine-learned models to generate a loading framework for loading data to the target location; and copying the replication data from the data source to the target location based on the extraction framework and the loading framework.

Another example aspect of the present disclosure is directed to one or more non-transitory computer-readable media that collectively store instructions that, when executed by one or more processors, cause the one or more processors to perform operations. The operations include receiving, from a client device, client requirements associated with a dataflow from a data source to a target location, the client requirements having an expected data freshness value and an expected data query latency value; processing the expected data freshness value with one or more machine-learned models to generate an extraction framework for extracting data from the data source; processing the expected data query latency value with the one or more machine-learned models to generate a loading framework for loading data to the target location; and copying the replication data from the data source to the target location based on the extraction framework and the loading framework.

It will be appreciated that embodiments of the systems, methods and instructions described above can reduce computing resource requirements (e.g. CPU and memory) and reduce data freshness delay and increase data freshness.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 1A-1G depict block diagrams of an example operation of an online content serving system according to example embodiments of the present disclosure.

Figure 1A:
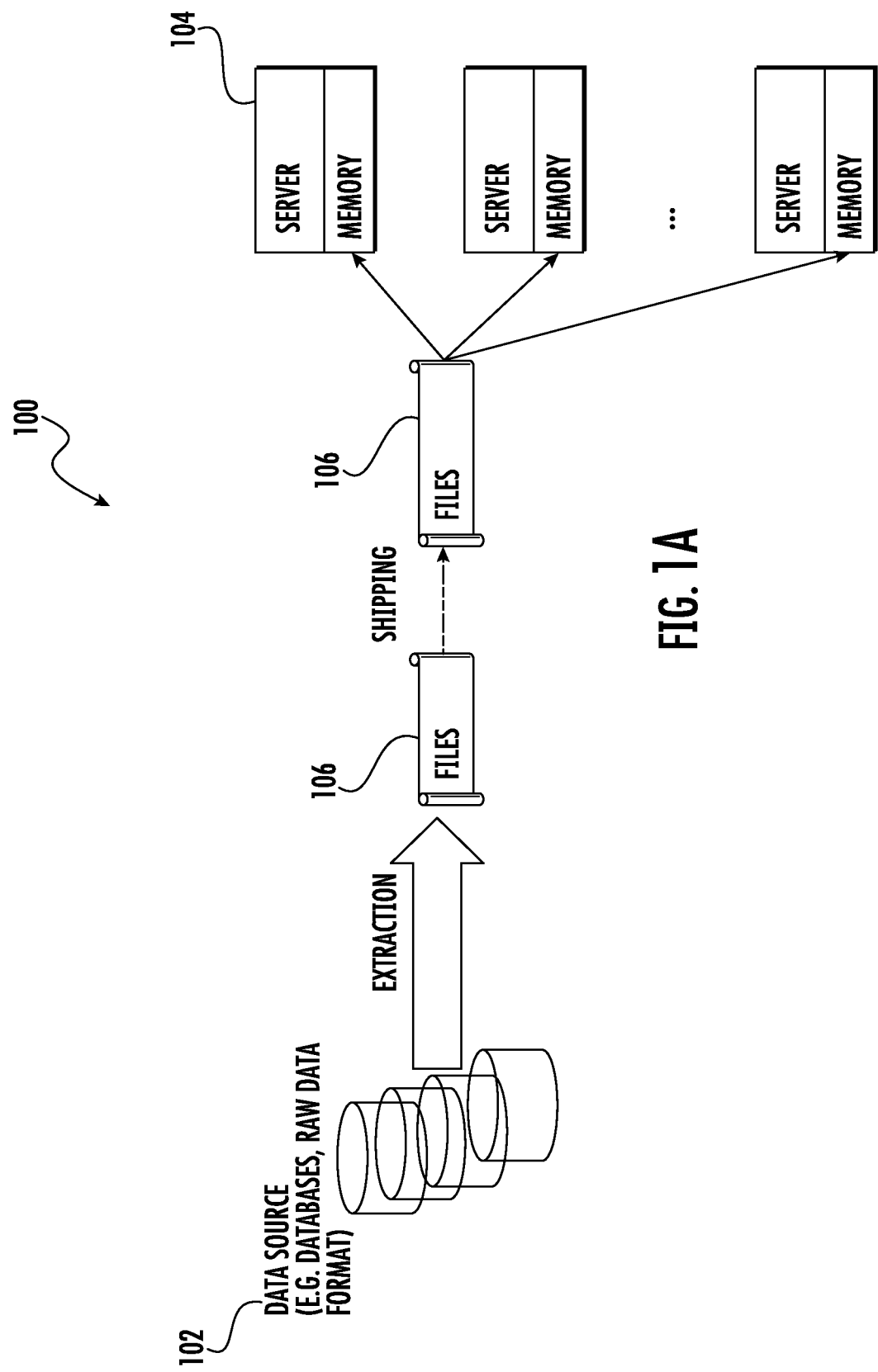

Reference numerals that are repeated across plural figures are intended to identify the same features in various implementations.

DETAILED DESCRIPTION

Overview

In online content serving systems, content servers can publish content based on data (e.g., profile data, performance data, geographic data) stored in a data source. In conventional systems, a content server can fetch the data for each content by sending a remote request to a remote data source (e.g., databases, raw data format). Latency and data freshness are key performance metrics for publishing content in the online ecosystem. For optimal user experience, a content server sending a remote request to a remote data source may not be practical for online content serving systems, because content should be published in real-time (e.g., in milliseconds). As a result, in some instances, the data in the data source (e.g., remote server) can be replicated in the target server to reduce latency. Additionally, for the scenarios where the system queries replica data from a target server, the data freshness of the replica data may need to be satisfactory to requirements set by a client.

FIG. 1A depicts an example operation 100 of an online content serving system for shipping data from remote data source 102 to a target server 104, according to example embodiments of the present disclosure. The data (e.g., replica data) can be stored in the memory of the target server 104 by copying the data stored in the remote data source 102. To reduce the latency, conventional content servers can load data (e.g., replica data) into target data source and query the data without having to access the remote data source. The target data source can be a replica copy of a remote data source. In some instances, the conventional system can extract remote source data into files 106. Then, the conventional system can ship the files 106 and load files 106 to target servers 104.

FIG. 1B depicts an example operation 110 of an online content serving system associated with extracting a snapshot and incremental delta changes from a remote data source 102 and loading the data to a target server 104, according to example embodiments of the present disclosure. In addition to data latency, data freshness is a key performance metric for online content serving systems. Data freshness can be based on the frequency of extraction when a system extracts a full snapshot of remote source data 102 and ships it to target server 104. However, extraction of a full snapshot of data can be expensive and costly in terms of computation and storage cost. Given that there exists data duplication between different snapshots, the system can instead extract the delta incremental changes 114 from the remote data source 102 and ship the delta incremental changes 114 to target servers 104. Subsequently, the system can apply the delta incremental changes 114 on the existing snapshot 112 stored on the target server 104. As a result, the system can reduce the data traffic since the system only extracts the changes of the data instead of all the data. For example, the size of the delta incremental changes 114 can be much smaller compared to the full snapshot 112. Therefore, the system can reduce the data size during shipments and reduces the cost of extraction.

In some instances, to support real time replication, the system can extract remote data sources into files with two formats. A first data format can be the snapshot data 112 which provides the whole snapshot of data $Data_{snapshot}$ for a specific checkpoint $X_{checkpoint}$. A second data format can the delta incremental changes $Data_{delta}$. For example, when loading data into memory, the system first fetches the data snapshot 112 from data source 102 with a specific checkpoint $X_{checkpoint}$. Then, the system can fetch data with delta incremental changes 114 and applies all the changes after checkpoint $X_{checkpoint}$. Therefore, the system can support real-time data replication.

Figure 1C:
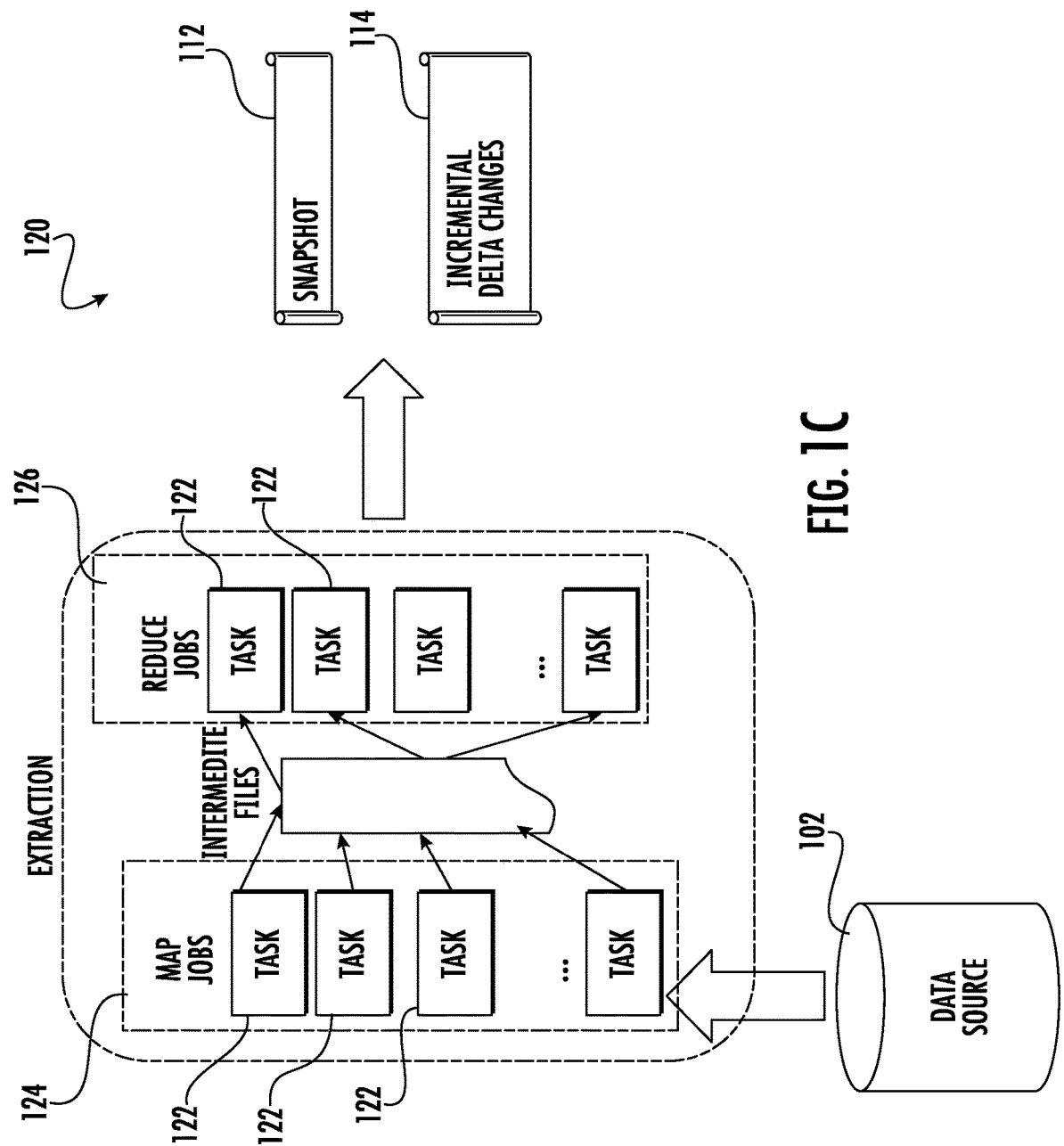

FIG. 1C depicts an example map-reduce framework for an extraction operation 120 of an online content serving system, according to example embodiments of the present disclosure. The extraction operation 120 can be a heavy computation operation, especially for online content serving system having a large data source 102 (e.g., in the terabytes (TBs) or petabytes (PBs)). Additionally, the extraction operation 120 can also involves heavy computation operations such as user defined functions, a filter function, a join function, or other data functions. To improve the performance and efficiency of the extraction operation 120, the system can utilize a map-reduce framework for parallel extraction of the data. The map-reduce framework can implement machine-learned models, using techniques described herein, to divide a task 122 into small parts and assign them to multiple systems. The map-reduce framework can include a plurality of map jobs 124 and a plurality of reduce jobs 126. The plurality of map jobs 124 can take an input, tokenize the input, map the input, and sort the input. The output of the plurality of map jobs 124 can be used as input by the plurality of reduce jobs 126, which in turn searches matching pairs and reduces them. The map-reduce framework can include the sorting, searching, indexing, and term frequency-inverse document frequency (TF-IDF).

FIG. 1D depicts an example of data loading operation 130 that loads data into the local memory of the target server 104, according to example embodiments of the present disclosure. For example, if file size of the $Data_{snapshot}$ file and $Data_{Delta}$ file are small (e.g. in GBs), the system can load in the memory of the target server (e.g., query server). Therefore, the loading task and the query task can be located on the same server. As a result, the server can visit the data directly without any remote procedure calls (RPCs). As background, RPCs enable a system to request a service from a program located in a remote computer on a network, which can occur when the loading task and the query task can be located on different servers. When the loading task and the query task are located on the same server (e.g., target server 104), the query latency can be minimal (e.g., in microseconds). Additionally, the system can have a separate data management task 130 to manage the data loading status. Subsequently, the query server (e.g., target server 104) can visit the data directly.

Figure 1E:
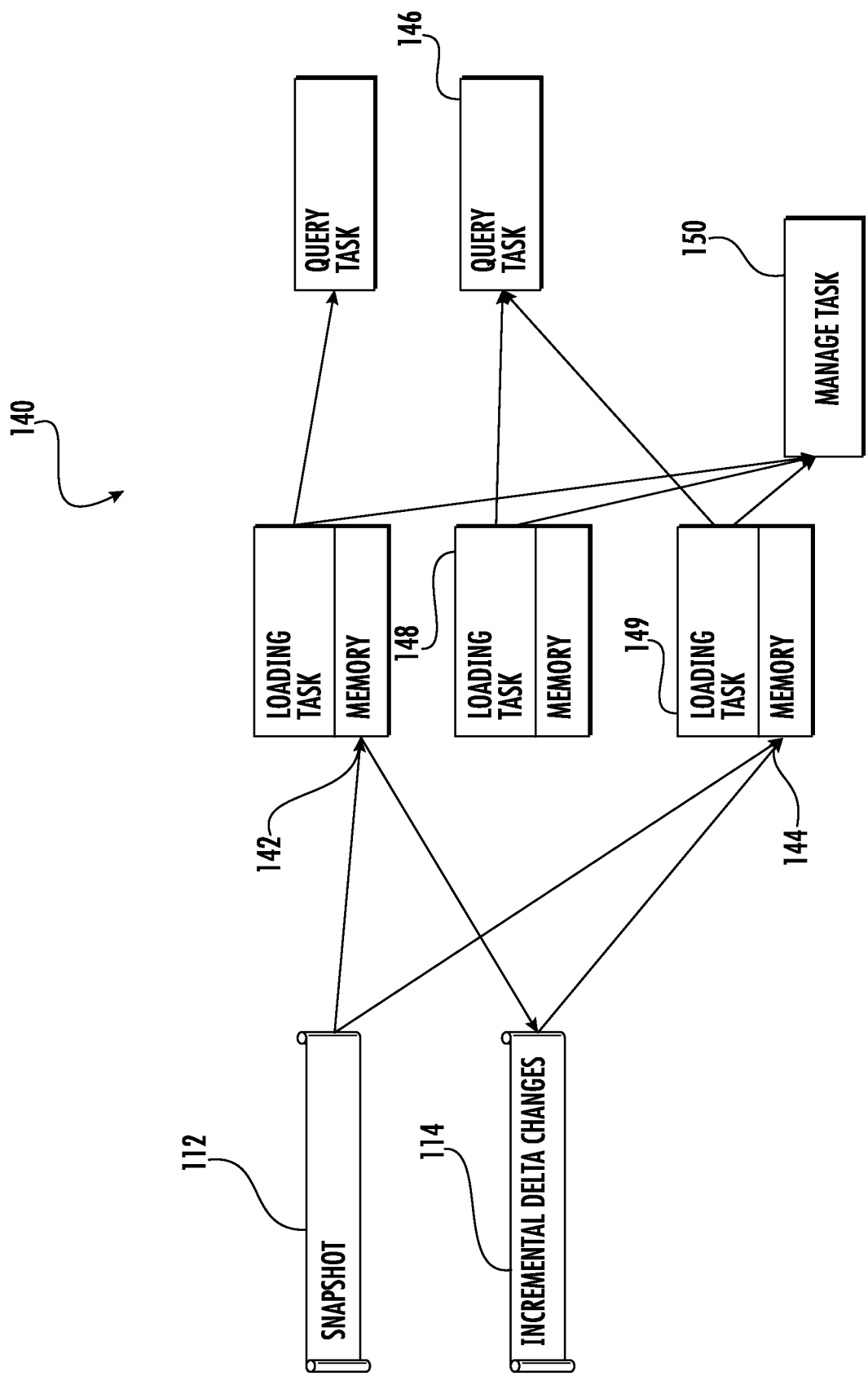

FIG. 1E depicts an example of the data loading operation 140 that separates loading and query tasks (e.g., due to the large data size of the data source) to different servers, according to example embodiments of the present disclosure. In contrast to the data loading operation in FIG. 1D, the system may not be able to load all the data in the memory of the same server when data size is large (e.g. in TBs or PBs). As a result, the same data may be loaded into different servers (e.g., first server 142 and second server 144 in FIG. 1E) because multiple servers may be needed to store the data. Additionally, in some instances, loading the data into different servers may cause double loading issues. Moreover, the data loading operation 140 (e.g., where the loading tasks and the query task are separated into different jobs) can properly function when the query latency requirement (e.g., from the client) is not stringent (e.g., milliseconds). In the data loading operation 140 of FIG. 1E, a query task 146 can send RPCs to a first loading task 148 and a second loading task 149 to fetch the data. The loading tasks 148, 149 can load data from files. The query task 146 can send RPCs to loading tasks 148, 149 to fetch the data. In the data loading operation 140, a management task 150 can also be utilized to manage the various loading status.

Figure 1F:
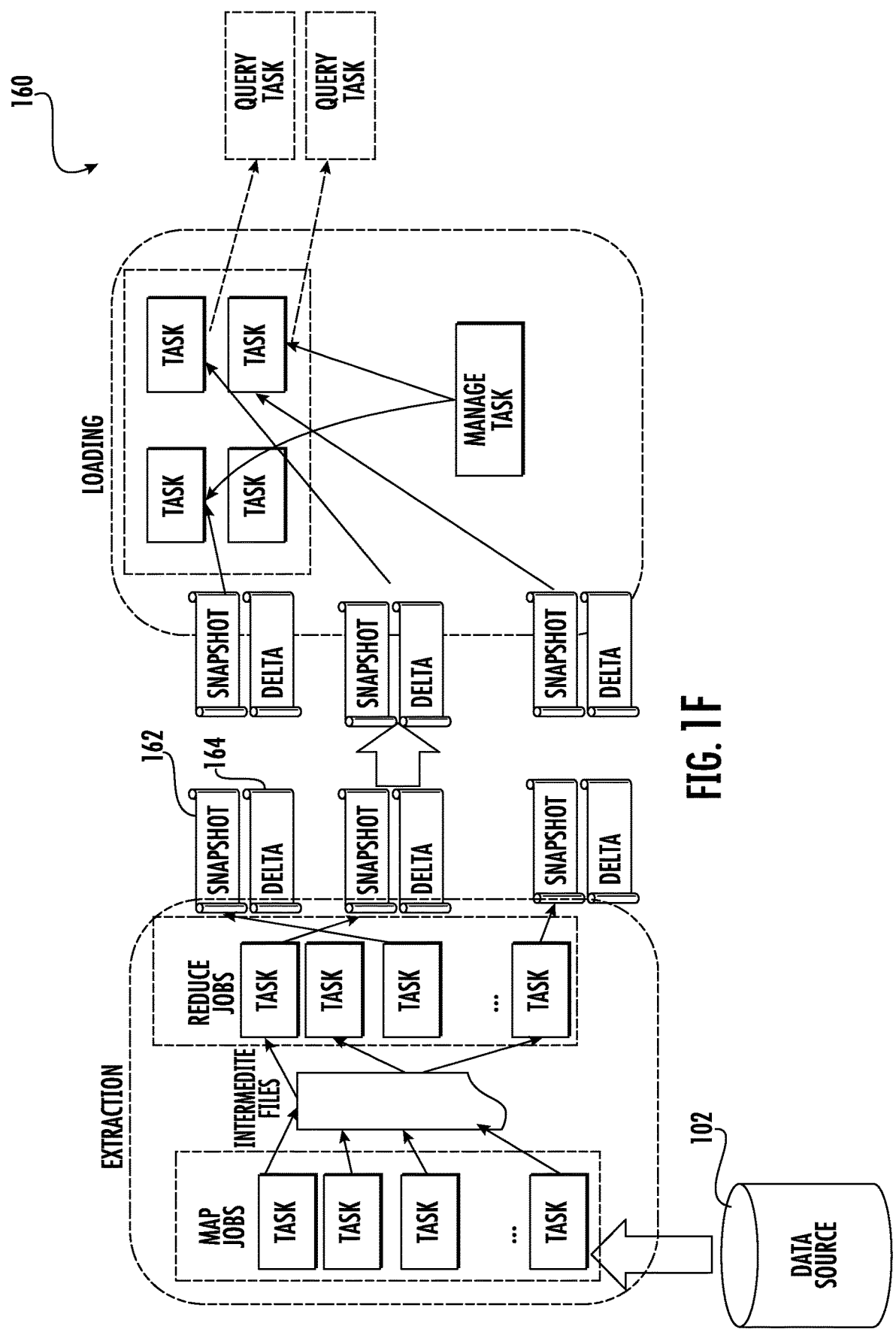

FIG. 1F depicts an example sharding operation 160, according to example embodiments of the present disclosure. The system can perform sharding operation 160 to shard the extracted files in K-way (e.g., 3) so that the sharded files can be loaded in different servers. The system can shard the $Data_{snapshot}$ file 162 and $Data_{Delta}$ file 164 in an optimal way, by using one or more machine-learned models, to balance the performance and cost.

When the $Data_{snapshot}$ file 162 is above a first size threshold (e.g., 1 TB, 10 TBs, 100 TBs, PBs), the $Data_{snapshot}$ file 162 may not be able to be loaded in the same server. By using techniques described herein, the system, using machine-learned models, can split the $Data_{snapshot}$ file 162 and/or the $Data_{Delta}$ file 164 into smaller split files by the sharding operation 160.

In the example depicted in FIG. 1F, the $Data_{snapshot}$ file 162 are sharded into three split files. Additionally, when the $Data_{snapshot}$ file 162 is above the first size threshold, the loading time to handle the $Data_{snapshot}$ file 162 will increase and as a result impact the data freshness. By sharding the $Data_{snapshot}$ file 162 into split files, and then load the split files in parallel, the system can reduce the data freshness delay and increase the data freshness.

Alternatively, when the $Data_{snapshot}$ file 162 are below a second size threshold (e.g., 100 megabytes (MBs), 10 gigabytes (GBs)), opening each file introduces an extra cost, which can also cause data freshness delay. Therefore when the $Data_{snapshot}$ file 162 are below the second size threshold (e.g., memory size threshold), the system can combine several small files to one aggregated file, which reduces data freshness delay and also saves computing resources (e.g., CPU and memory).

Similarly, the changes of $Data_{Delta}$ file 164 can be sharded in an optimal way, by using machine-learned models, to improve performance. For example, for every second, the system can only handle the limited changes due to limited resources. Additionally, each loading thread could only handle one $Data_{Delta}$ file 164 to guarantee the final data consistency. Therefore, if there are too many changes in the $Data_{Delta}$ file 164, it can reduce data freshness. As a result, by splitting the $Data_{Delta}$ file 164 into multiple split files by some sharding functions to improve the concurrency. Alternatively, too small changes in the $Data_{Delta}$ file 164 file can add the cost of opening and maintaining.

Figure 1G:
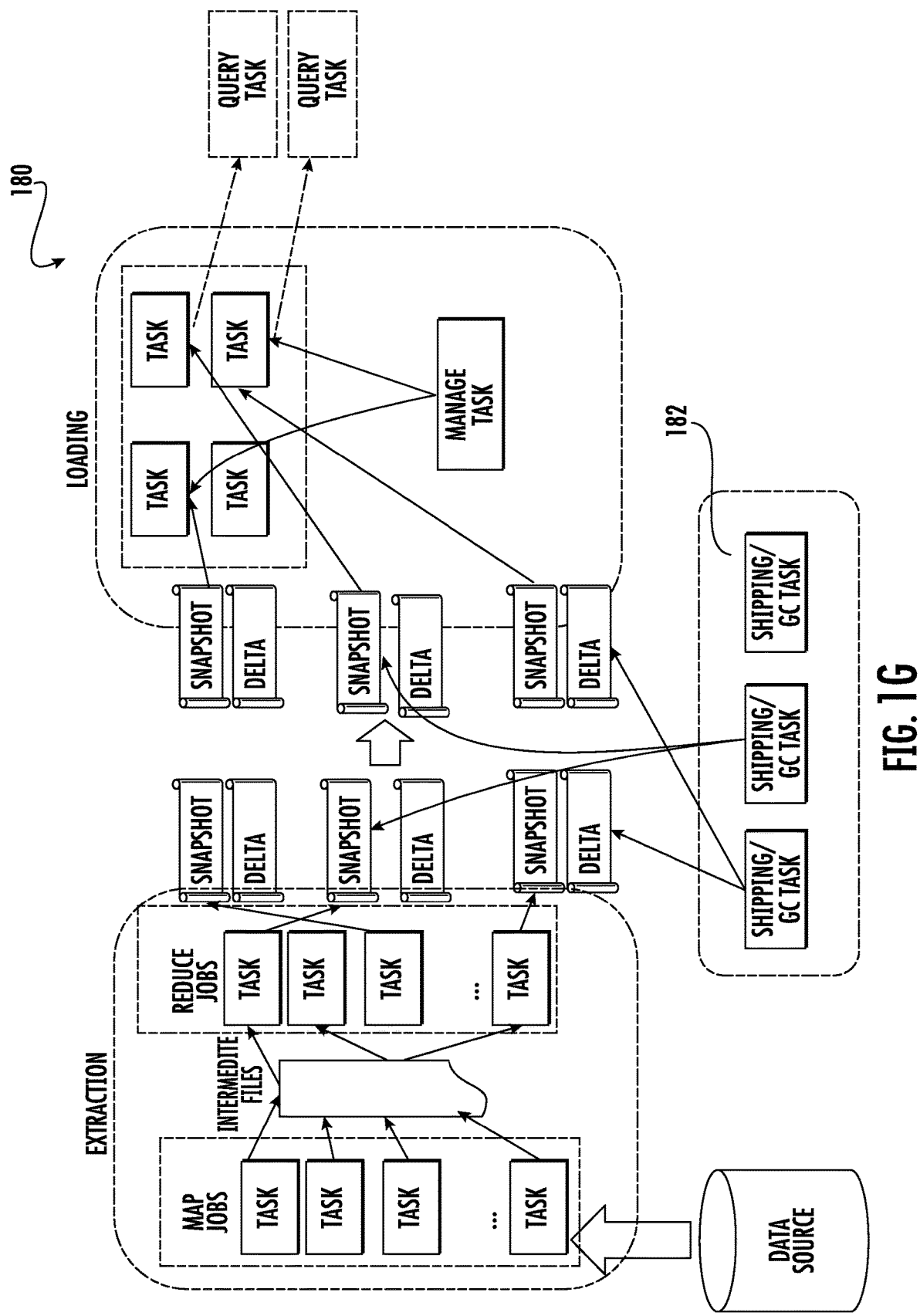

FIG. 1G depicts an example shipping and garbage collection operation 180, according to example embodiments of the present disclosure. In some instances, shipping tasks can copy the files (e.g., $Data_{snapshot}$ file 162, $Data_{Delta}$ file 164) from remote data source 102 to target server 104. Additionally, garbage collection (GC) of the files can be performed by the system after files are successfully loaded in the target server 104. Furthermore, when the files already split into K-ways, then the shipping and GC tasks 182 can be performed in parallel by the system.

FIG. 1G illustrates that conventional data replication in online content systems is complex and involves multiple components. Since some of the components are interconnected, any data flow changes can impact the whole system, which makes the system even more complex. Because of the complexity and for safety concerns, manual manipulation may be required in conventional systems in order to adjust any data flow changes. In some instances, engineers can perform the following scenarios for conventional data replication operations. In a first scenario where the data flow has not served queries in production, then the operations can include: (i) turning down the old data flow completely, creating a new data flow with a new setup, manually monitoring the new setup for a period of time to ensure that the new setup is stable, and collecting performance metrics data to determine whether the new setup has met expectations and/or requirements. If expectations and/or requirements have been met, then proceed with the new setup. Alternatively, if expectations and/or requirements have not been met, then (ii) repeat the process from (i) with a different new setup. In a second scenario when the data flow has already served queries in production, then the operations can include: (iii) creating a new data flow with a new setup while old data flow still serves the production query. Additionally, the operations can include: (iv) after the new data flow is stable, gradually switch the production query traffic to the new data flow. For example, first 1% traffic, if performance metrics goes well, continue to 10% traffic, then 50% then full traffic. If performance metrics do not behave as expected, then create another data flow with adjusted setup and repeat the process from (iii).

As described in the first and second scenarios and examples depicted in FIG. 1G, data flow setup and/or adjustments can be based on the engineer's experiences. Therefore, any data flow changes in a conventional system may require the involvement of experienced engineers. Additionally, one round of data flow change may need engineers to access the system for weeks or even months for system stability, which can reduce productivity and delay system deployment.

Figure 2:
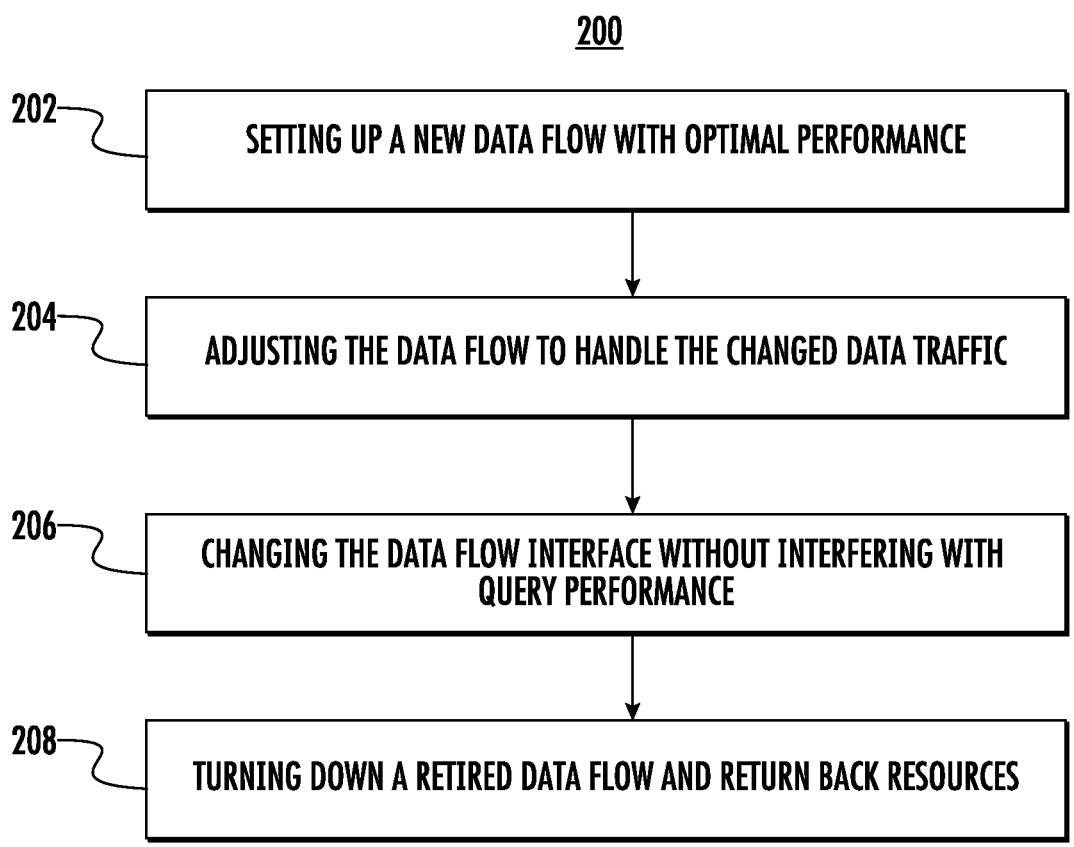
FIG. 2 depicts a flow chart diagram of an example method to perform data replication using machine-learned models according to example embodiments of the present disclosure.

FIG. 2 depicts a flow diagram of operations being performed by a system having a data flow controller (DFC) component, according to example embodiments of the present disclosure. Using the techniques described herein, the DFC component, using machine-learned models, can handle data flow more efficiently and achieves better performance than manual manipulation. In some instances, the DFC component can perform operations 200 to improve data flow performance, even when the system has limited computing resources (e.g., CPU, memory).

Figure 4:
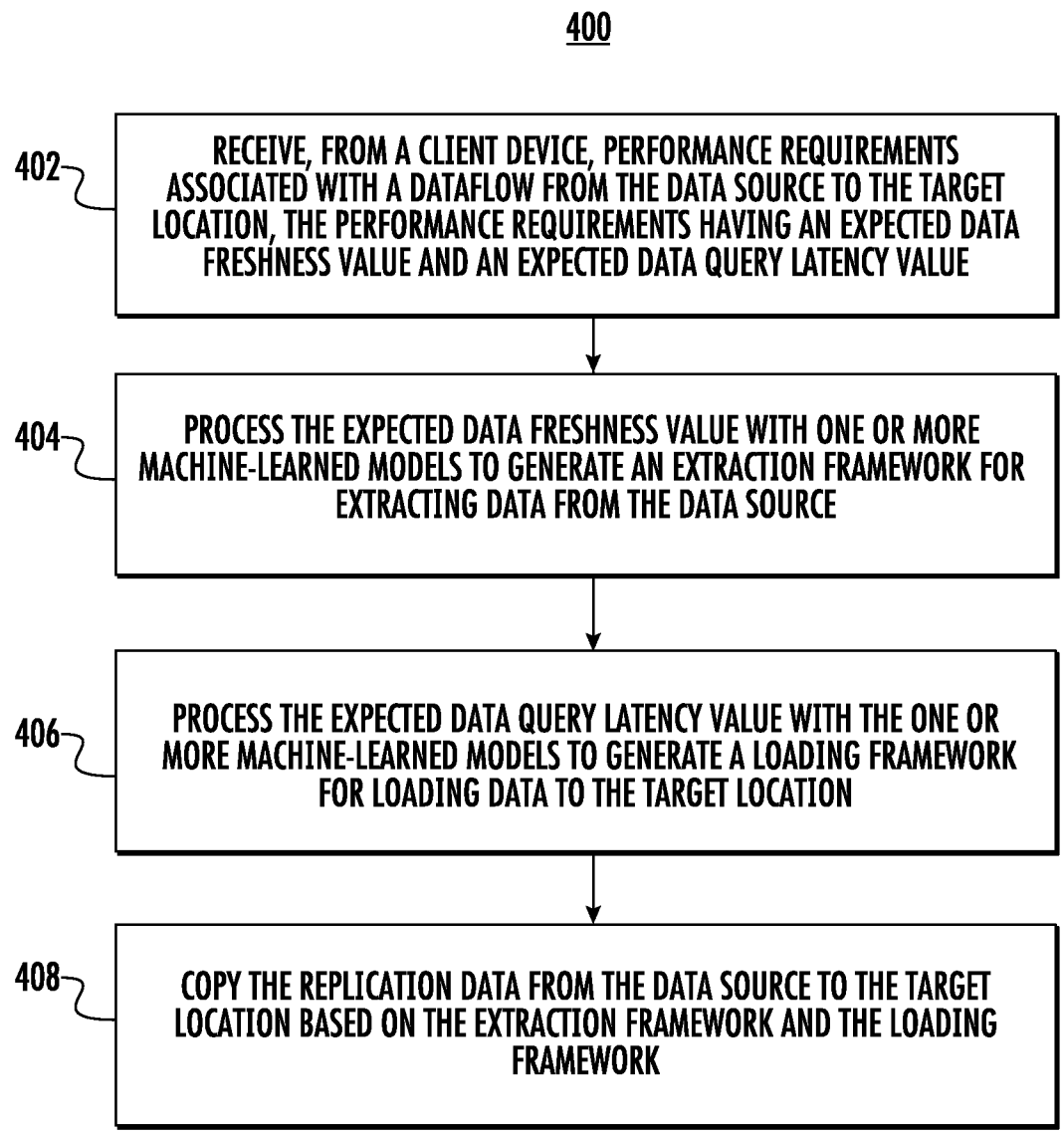
FIG. 4 depicts a flow chart diagram of an example method for generating replication data from a data source to be stored in a target location according to example embodiments of the present disclosure.

For example, at 202, the DFC component can set up (e.g., turning up) a new data flow with the optimal performance (data freshness and query latency) by using machine-learned models. FIG. 4 describes an example method of setting up a new data flow by using the DFC component and the machine-learned models. The machine-learned models are further described in FIGS. 5A-C.

Additionally, at 204, the DFC component can adjust, using the machine-learned models, the data flow to handle the changed data traffic without interfering with query performance. For example, the changed data traffic can be inputted into the machined-learned models to be processed and output suggested parameters changes in the data flow setup.

Moreover, at 206, the DFC component can change the data flow interface without interfering with query performance. For example, the data flow interface can be inputted into the machined-learned models to be processed and output suggested parameters changes in the data flow interface in real-time without interfering with current data flow.

Furthermore, at 208, the DFC component can turn down a retired data flow and return back resources. For example, the machined-learned models to process the system and determine an optimal way to turn down a retired data flow and also return back resources to the ecosystem.

Figure 3A:
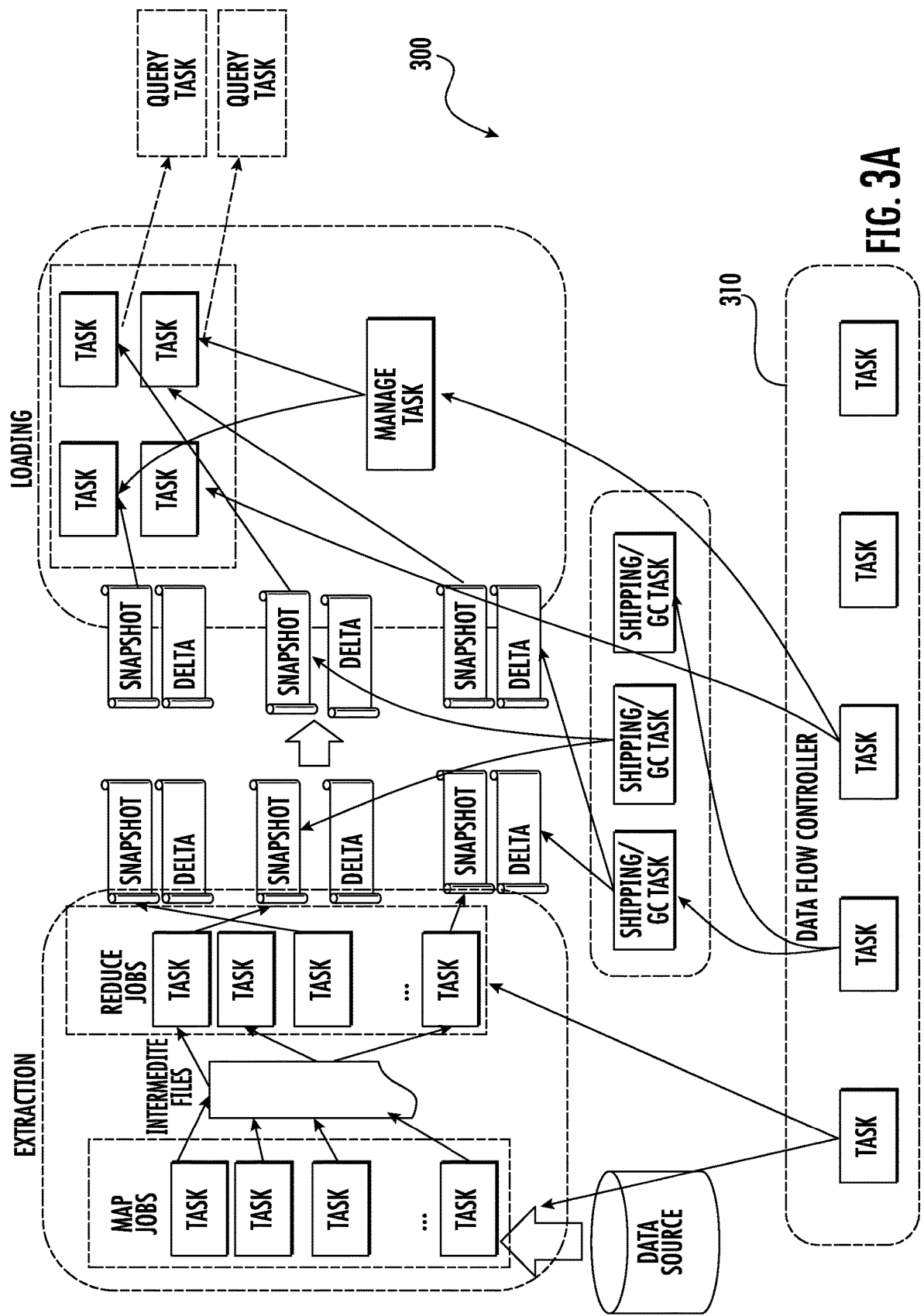
FIGS. 3A-3G depict block diagrams of an example system having a data flow controller (DFC) according to example embodiments of the present disclosure.

FIG. 3A depicts an example data flow controller (DFC) component 310 as part of an overall system 300, according to example embodiments of the present disclosure. The DFC component 310 can configure the extraction, loading and shipping components for data flow changes. To handle the data flow changes, the DFC component 310 can perform operations, by using machine-learned models, to automatically adjust the data flow without manual intervention. As previously mentioned, FIG. 1G can be an example of a data flow in production, and the system can collect performance metrics for the data flow. The client requirements (e.g., performance metrics) can be added into a training data flow pool (e.g., training data flow pool 352 in FIG. 3C) for the future prediction setup of new data flow.

Figure 3B:
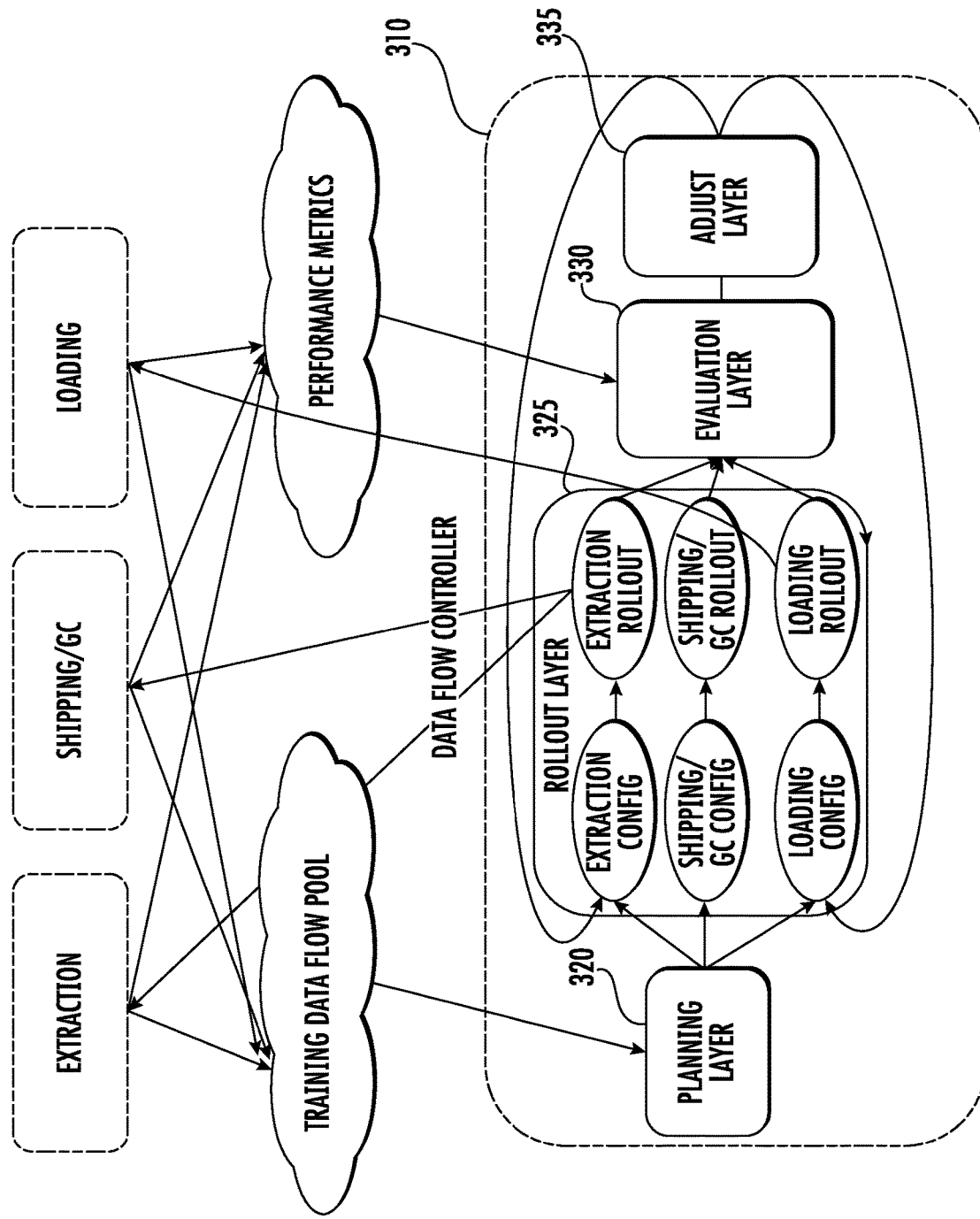

FIG. 3B depicts the DFC component 310 having a plurality of layers, according to example embodiments of the present disclosure. The DFC component 310 can include a planning layer 320, a rollout layer 325, an evaluation layer 330, and an adjust layer 335.

The planning layer 320 can perform planning operations. When receiving client requirements (e.g., performance requirements, expected data freshness, query latency latency), the DFC component 310 can analyze, using machine-learned models with training data flow pool (e.g., training data flow pool 352 in FIG. 3C), the client data extraction and/or data query pattern to generate an extraction framework, a shipping framework, and/or a loading framework. As later described in FIG. 4, the system (e.g., DFC) can receive performance requirements at operation 402 in method 400. Additionally, the system can generate the extraction framework at operation 404 in method 400. The planning layer 320 can determine whether a system meets client performance requirements. If the system determines that the performance requirements cannot be met, then the planning layer 320 can either reject the performance requirements, modify the performance requirements, or predict extra resource cost needed until the system can meet the performance requirements. If the system determines that the performance requirements can be met, the planning layer 320 can generates the extraction framework (e.g., predicted configuration for extraction tasks), the shipping framework (e.g., predicted configuration for shipping tasks), and the loading framework (e.g., predicted configuration for loading tasks).

The rollout layer 325 can rollout the extraction framework, the shipping framework, and/or the loading framework. For example, the rollout layer can rollout the configurations generated by the planning layer 220 (e.g., the extraction framework, the shipping framework, and/or the loading framework). In some instances, the rollout can include several steps which guarantee safety without racing issues.

The evaluation layer 330 can collect performance metrics to evaluate the performance of new rollouts. In some instances, when the client requirements (e.g., as requested by a client) are met, the data flow operations can end at the evaluation layer.

In some instances, when the client requirements are not met (e.g., client expectations are not met), the adjust layer 335 can tune, using the machine-learned models, the parameters of the data flow operations and generate the new configuration for the rollout layer to repeat the process.

Figure 3C:
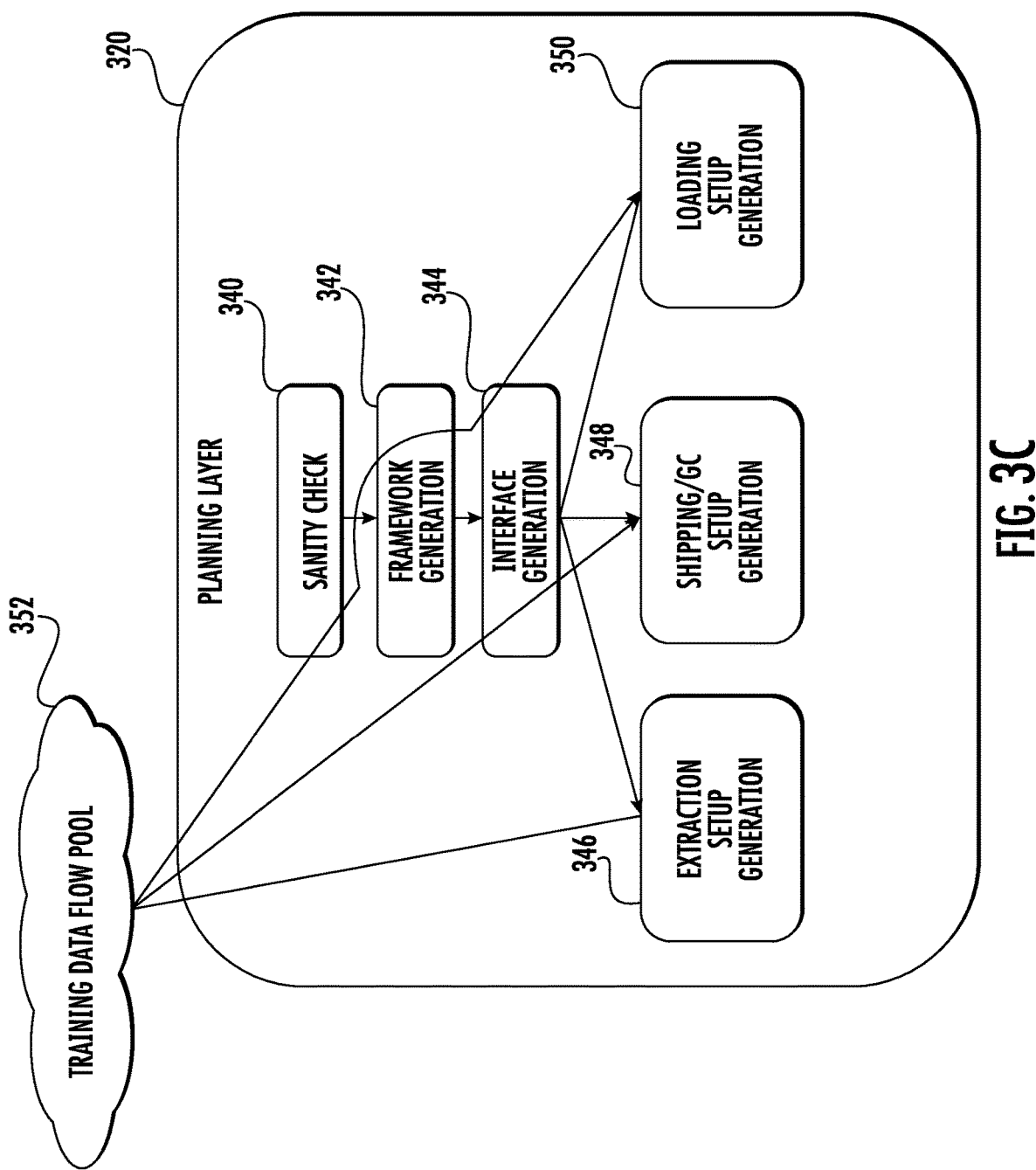

FIG. 3C depicts an example planning layer 320 of a DFC component 310 for setting up a new dataflow, according to example embodiments of the present disclosure. As previously described in FIG. 2, the DFC component 310 can perform the setting up of a new data flow at operations 202.

According to some embodiments, a client device can provide client requirements (e.g., system input information) to set up a new data flow. The client requirements can include, but not limited to, a function (FS), expected data freshness (EF) from successful loaded data, expected data query latency (EQ), source and target location (ST), query function (QF), and a number of queries per second (QPS). The function (FS) can be a function to extract data from a source. For example, as depicted in the box below, data_view_1 can involve filter operation to filter some data from source, and data_view_2 can involve a join operation to join the data across different tables. Additionally, the query function (QF) can be simplified to reduce the query latency. Thus, in some embodiments, the heavy computation operations can be computed on the extraction side.

```
data_view_1:
Select col1, col2 from Tab1 where col0 = xxx
data_view_2:
Select Tab1.col1, Tab2.col1 from Tab1, Tab2 where Tab1.col0 =
Tab2.col0
```

Referring back to FIG. 3C, the planning layer 320 can include a sanity check 340, framework generation 342, interface generation 344, extraction setup generation 346, shipping/GC setup generation 348, and loading setup generation 350 operations. The framework generation and setup generation can be generated by the DFC component using machine-learned models that are trained with the training data flow pool 352. Additionally, the planning component 320 can utilize training data flow pool 352 as input for the extraction setup generation 346, shipping/GC setup generation 348, and loading setup generation 350 operations. FIGS. 1A-1G describes techniques for performing the sanity check 340, framework generation 342, interface generation 344, extraction setup generation 346, shipping/GC setup generation 348, and loading setup generation 350 operations.

With regards to the framework generation 320, the DFC component 310 can, based on client requirements (e.g., EF, EQ), generate system frameworks using the machine-learned models that have been trained with the training data flow pool 352.

Table 1 below is an example of an extraction framework generated by the DFC component 310. In this example, the extraction framework is generated, using machine-learned models, based on expected data freshness (EF). As previously, EF can be a client requirement that is received from a client device.

TABLE 1

| Extraction Framework based on EF | |
|---|---|
| EF (Expect Data Freshness) | Extraction Framework:<br>a. Snapshot only<br>b. Snapshot with incremental changes<br>$framework_{extraction} =$<br>{<br>$framework_{snapshot}, framework_{snapshot\&inc}$<br>} |
| >1 day | $framework_{snapshot}$ |
| <6 hour | $framework_{snapshot\&inc}$ |
| 6 hour < EF < 1 day | If the client specifies an extraction framework, honor client setup.<br>If not, set $framework_{snapshot\&inc}$. |

Table 2 below is an example of a loading framework generated by the DFC component 310. In this example, the loading framework is generated, using machine-learned models, based on expected data query latency (EQ). As previously, EQ can be a client requirement that is received from a client device.

TABLE 2

| Loading Framework based on EQ | |
|---|---|
| EQ (Expected Data Query latency) | Loading framework:<br>i) local loading (loading and query locates on the same task. FIG. 1.4)<br>ii) remote loading (loading and query tasks are separate FIG. 1.5)<br>$framework_{loading} =$<br>$\{framework_{local}, framework_{remote}\}$ |

TABLE 2-continued

| Loading Framework based on EQ | |
|---|---|
| ~us | $framework_{local}$ |
| others | $framework_{remote}$ |

With regards to the interface generation 344, the DFC component 310 can determine the file interface between extraction and loading tasks based on training data flow pool 352. In some instances, the DFC component 310 can perform sharding computations. As previously described in FIG. 1F, the DFC component 310 can determine the optimal number of files (e.g., K-way files) to improve the parallelism process. For example, the DFC component 310 can determine the number K for a new data flow set up. By using the machine-learned models and the training data flow pool 352, the DFC component 310 can analyze the data traffic based on the extraction function. If the loading framework is local, then querying and loading locates on the same task. In this case, if K is a multiplier of the number of tasks, each task can be load multiple files and one file is only loaded in one task. In this example, tasks will not scan or filter out extra data. Here is an example machine-learned model to compute the number of K, by:

$$K = f_{INTERFACE}(FS, framework, \#tasks),$$

where $f_{INTERFACE}$ can be trained by using the training data flow pool (e.g., which can include tens of thousands of existing data flows).

With regards to extraction setup generation 346, the DFC component 310 can perform a map task setup and a reduce task setup. FIG. 1C described example techniques for setting up a map task and a reduce task. For example, map setup can include the number of extraction map tasks, map task RAM and GCU, and map function. Additionally, reduce setup can include the number of reduce tasks, reduce task RAM and CPU and reduce function. The DFC component 310 can customize map tasks and reduce tasks for each data flow to avoid interference and target better performance with customized tuning, as described using the machine-learned model below.

$$Map_{CONFIGURATION}(\#tasks, RAM, CPU) = Map_{EXTRACTION}(FS, framework, K)$$

$$Reduce_{CONFIGURATION}(\#tasks, RAM, CPU) = Reduce_{EXTRACTION}(FS, framework, K)$$

The machine-learned models can be trained by using the training data flow pool 352, which can include a large number (e.g., thousands) of existing Map-Reduce framework configurations. Additionally, the DFC component 310 can estimate the file size based on the training data flow pool 352 using the example model below.

$$FileSize_{snapshot} = f_{snapshot}(FS, K)$$

$$ChangeRate_{incremental} = f_{incremental}(FS, K)$$

With regards to the shipping (e.g., shipping and GC) setup generation 348, the DFC component can configure the shipping framework based on size of each file, sharding ways K and file generation frequency, and other shipping parameters. From training data flow pool 352, the machine-learned model can determine the shipping/GC configurations, as shown in the example below:

$$Shipping/GC_{configuration}(\#tasks, RAM, CPU) = f_{shipping/GC}(FileSize_{snapshot}, ChangeRate_{incremental}, Frequency, ST)$$

With regards to the loading setup generation 350, the DFC component can generate loading framework based on file size, QPS or other parameters. From training data flow pool, the machine-learned model can determine the loading setup configurations, as shown in the example below:

$$Loading_{configuration}(\#tasks, RAM, CPU) = f_{loading}(FileSize_{snapshot}, K, Snapshot_{frequency}, QPS, QF, loading_{framework}, \Delta_{adjust})$$

$$Loading_{framework} = \{local, remote\}$$

Figure 3D:
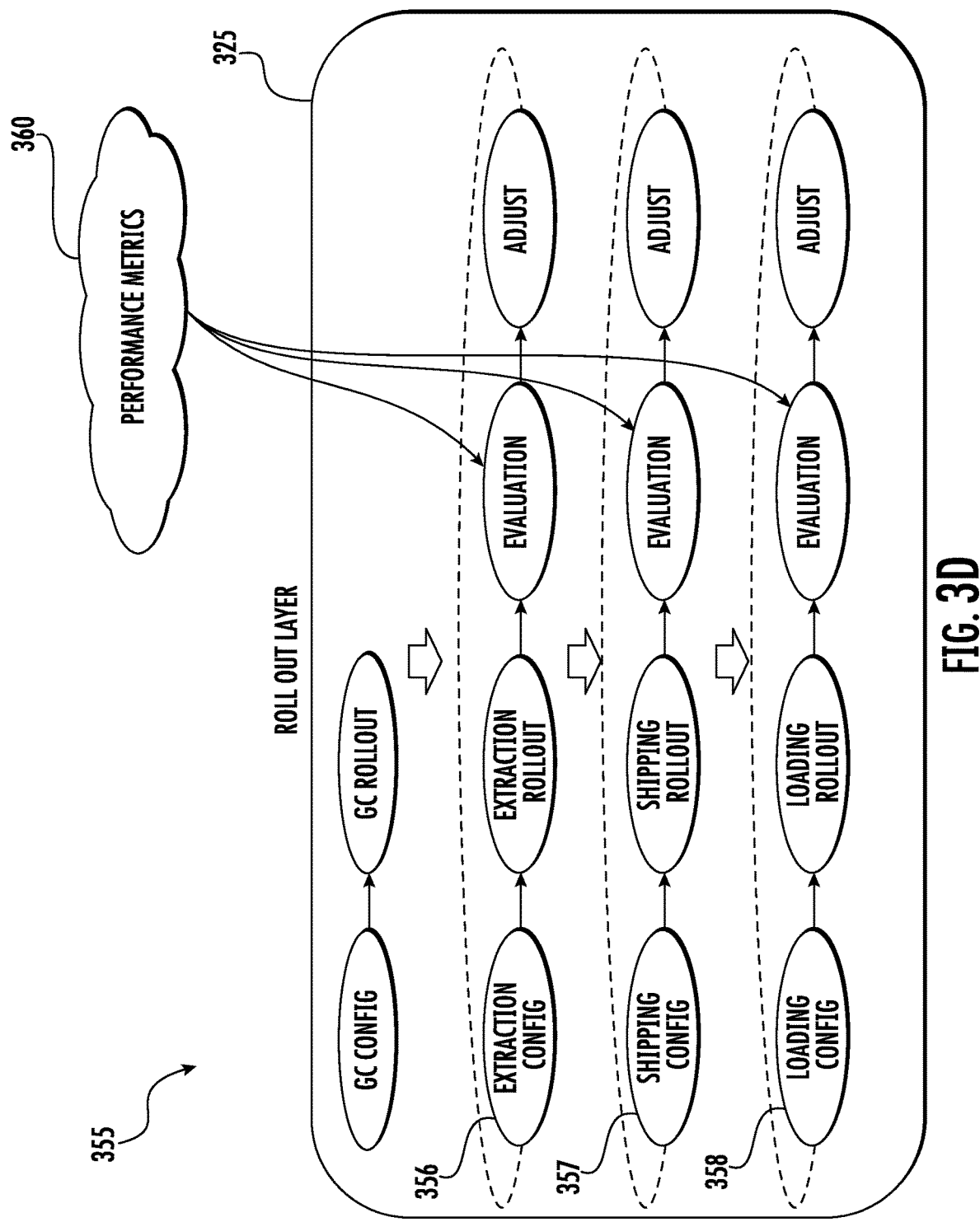

FIG. 3D depicts an adjusting the data flow operation 355 using the roll out layer 325 of the DFC component 310, according to example embodiments of the present disclosure. As previously described in FIG. 2, the DFC component 310 can adjust the data flow at operations 204 by using machine-learned models to adjust a parameter of the data flow configuration (e.g., extraction framework, loading framework).

To set up a new data flow, the DFC component 310 can roll out the extraction framework 356 (e.g., extraction configuration), the shipping framework 357 (e.g., shipping configuration), and the loading framework 358 (e.g., loading configurations) in parallel (e.g., in steps). Subsequently, the DFC component 310 can evaluate the performance metrics 360 of a framework (e.g., extraction framework 356, shipping framework 357, loading framework) and adjusts each framework separately without waiting for the whole rollout or evaluation to be completed.

According to some embodiments, the DFC component 310 can perform the following steps to safely roll out the configurations. At step 1, the DFC component 310 can set up GC configuration to ensure data flow can garbage collection before setting up data flow on the extraction side. At step 2, the DFC component 310 can check availability of resources for extraction configuration. If resources are not available, the DFC component 310 can notify clients for expected resources. At step 3, the DFC component 310 can rollout extraction framework 356 using the roll out layer 325. At step 4, the DFC component 310 can wait for a period of time (e.g., 1 day, 1 week) to get the extraction performance metrics 360 to determine whether client requirements (e.g., EF) are met. If the client requirement is not met, the DFC component 310 can tune the parameters of the extraction framework 356 and repeat extraction rollout steps. At step 5, the DFC component 310 can rollout shipping framework 357. Additionally, the DFC component 310 can collect the shipping performance metrics 360 and adjust the configuration if necessary. At step 6, the DFC component 310 can rollout loading framework 358. At step 7, the DFC component 310 can check loading performance metrics 360 to determine whether client requirements are being met. If the client requirement is not being met, the DFC component 310 can tune (e.g., modify, adjust) potential loading parameters and repeat loading rollout steps.

Figure 3E:
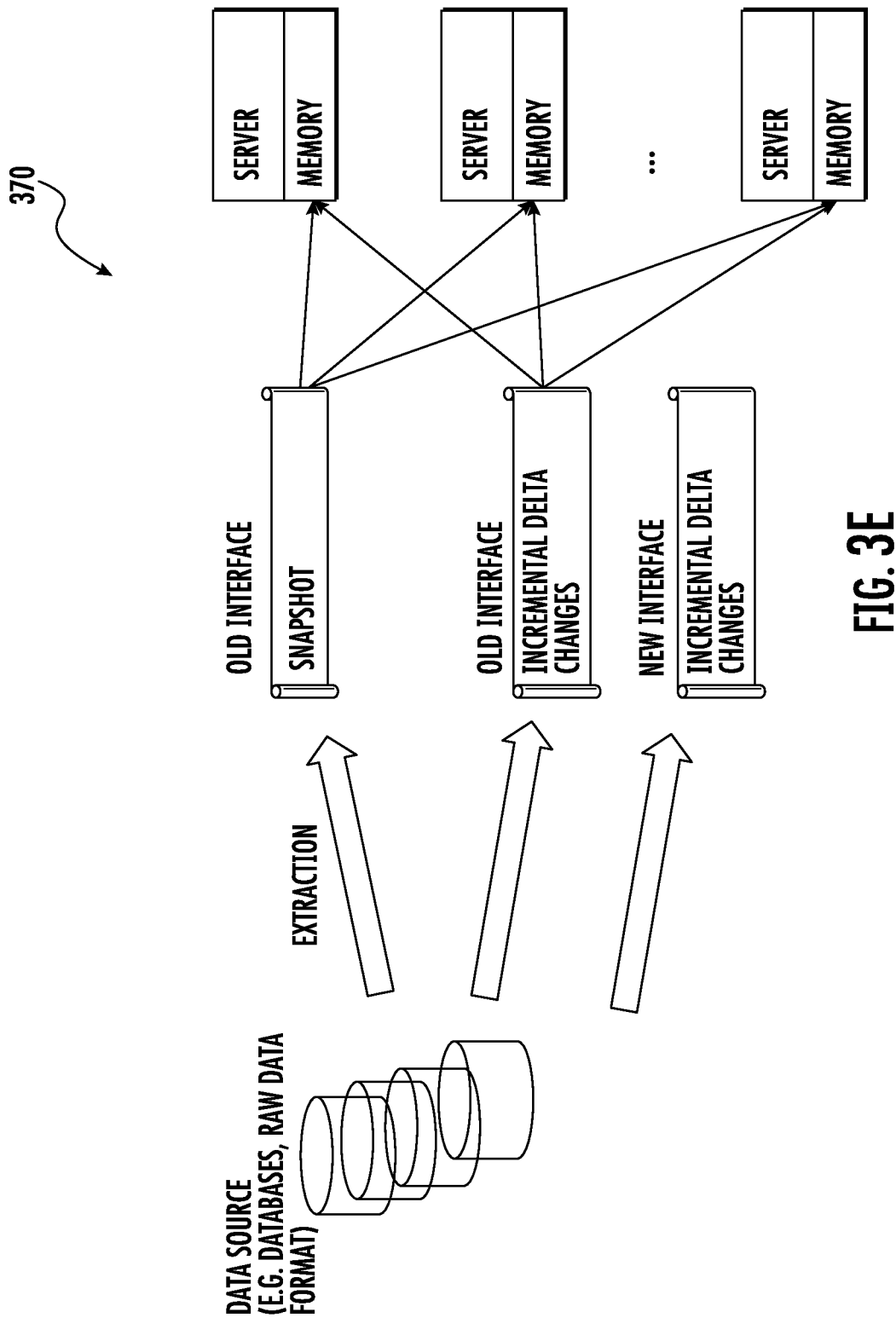

FIG. 3E depicts changing the data flow interface, according to example embodiments of the present disclosure. As previously mentioned, data replication of $Data_{snapshot}$ can be costly in terms of data size and computation. With the machine-learned models, the system is enabled to avoid unnecessary snapshot generation, which results in saving computing resources. The DFC component 310 can balance saving resources while avoiding interrupting the query performance. As previously described in FIG. 2, the DFC component 310 can change the data flow interface at operations 206.

According to some embodiments, the planning layer 320 can estimate resources if duplicate extraction tasks generate incremental files. If these extra resources are not available, the DFC component 310 can reject the data flow interface change to the client. Otherwise, the DFC component 310 can continue to the rollout layer 325 from the planning layer 320.

In the rollout layer 325, the DFC component 310 can set the loading side to handle the data with both data interfaces. That is, on the loading side, the DFC component 310 can specify two data interfaces to support, even though only the old data interface produces the data flow. In some instances, if sharding configuration changes, then the value of K is changed from $K_{old}$ ways to $K_{New}$ ways, and the loading side can reorganize the data from $K_{old}$ ways to $K_{New}$ ways data flows. In this scenario, the DFC component can utilize the header of snapshot or incremental data files shows the data information (e.g., $K_{old}$ ways or $K_{New}$). Thus, the loading side can adjust to $K_{old}$ ways or $K_{New}$ ways of loading.

Additionally, if the data type is changed from old to new data type, the header of data files shows the data type information. Thus, the loading side can adjust to load using old data type or new data type. Though the system specifies both data interfaces on the loading side, the extraction side only generates the old interfaces.

In the rollout layer, to support real time replication, extraction generated the incremental data for both old and new data interface, as depicted in FIG. 3E. FIG. 3E depicts generating incremental delta changes with new interface operation 370, according to example embodiments of the present disclosure.

If sharding configuration changes from $K_{old}$ ways to $K_{new}$ ways, extraction can generate incremental data files for both $K_{old}$ ways and $K_{new}$ ways. In some instances, extraction generates two incremental data files in parallel. That is, one incremental data file is for $K_{old}$ ways. And another incremental data file is for $K_{new}$ ways, and the header of incremental data files detects the data for $K_{old}$ ways or $K_{new}$ ways. Similarly, if data type is changed from old to new data type, extraction will generate incremental data files for both old and new data types in parallel. The header of incremental data files detects the data type for old or new.

After the extraction operation is stable, the DFC component 310 can leverage a safety check mechanism to check whether the newly generated data flow with a new data interface can be successfully loaded in the serving without interrupting the usage. In some instances, the safety check extraction tasks generate the snapshot files with the new data interface in another folder.

In the loading tasks, the DFC component 310 selects one task to load the safety check snapshot file with production incremental data for the new data interface. Additionally, the DFC component 310 monitors this loading task to be healthy. After one task is healthy for a while, the DFC component 310 selects the amount of loading tasks (e.g. 10%) to load the "safety check" snapshot file with production incremental data for the new data interface. If all these tasks are healthy for a while, then the system is safe enough to generate the production snapshot with a new data interface, as depicted in FIG. 3F.

Figure 3F:
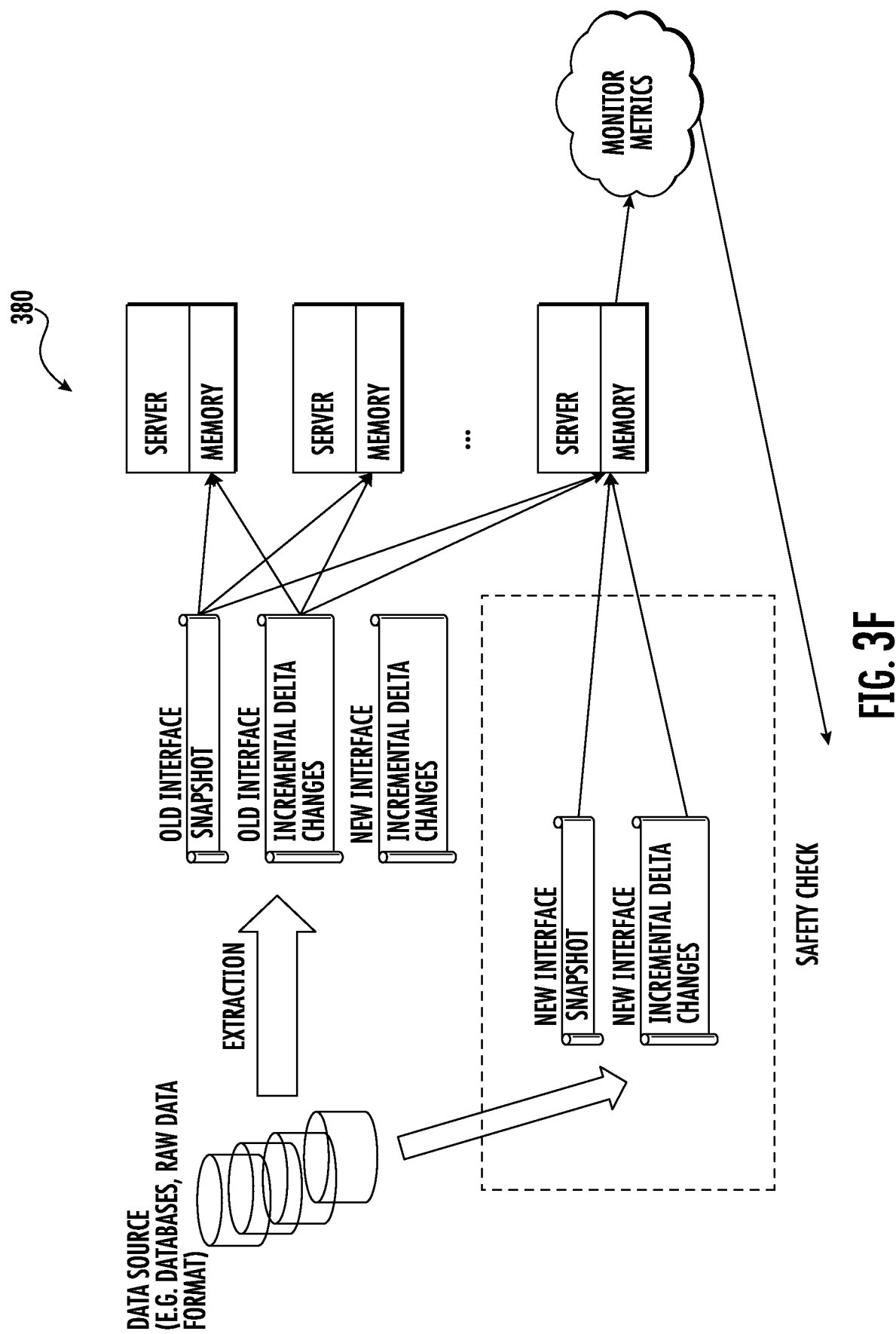

FIG. 3F depicts a safety check operation 380, according to example embodiments of the present disclosure. The safety check operation 380 can extract snapshot and incremental delta changes which apply to part of servers. During the safety check, the DFC component 310 can collect monitor metrics from the server sides. For example, the metrics can include information about how many entries are loaded in the servers, how much time it takes for the loading, what is the data end to end delay, and so on. If one or more of the metrics are not healthy, that can mean that the system does not pass the safety check. As a result the DFC component 310 does not proceed to the next step until the safety check is passed (e.g., the problem is resolved).

After passing the safety check, the DFC component 310 can flip the extraction side to only populate the snapshot with the new data interface since the extraction operation may have already generated incremental data files for both old and new data interfaces. Therefore, the loading side could depend on the snapshot data interface to decide which incremental file to use. In this way, the data interface could change in place without bothering the usage. If sharding configuration changes from $K_{old}$ ways to $K_{new}$ ways, extraction only provides the $K_{new}$ way snapshot. Similarly, if data type is changed from old to new data type, extraction will only generate the new data type.

After performing the safety check process, the DFC component 310 can set loading to only handle the new data interface. This can be a no-operation step, such that the loading side only consumes the snapshot and incremental data files with the new data interface. The DFC component 310 can ignore old incremental data files from the loading side.

After passing the safety check, the DFC component 310 can perform an extraction only operation to populate the incremental data with the new interface. This can be a no-op on the loading side.

Figure 3G:
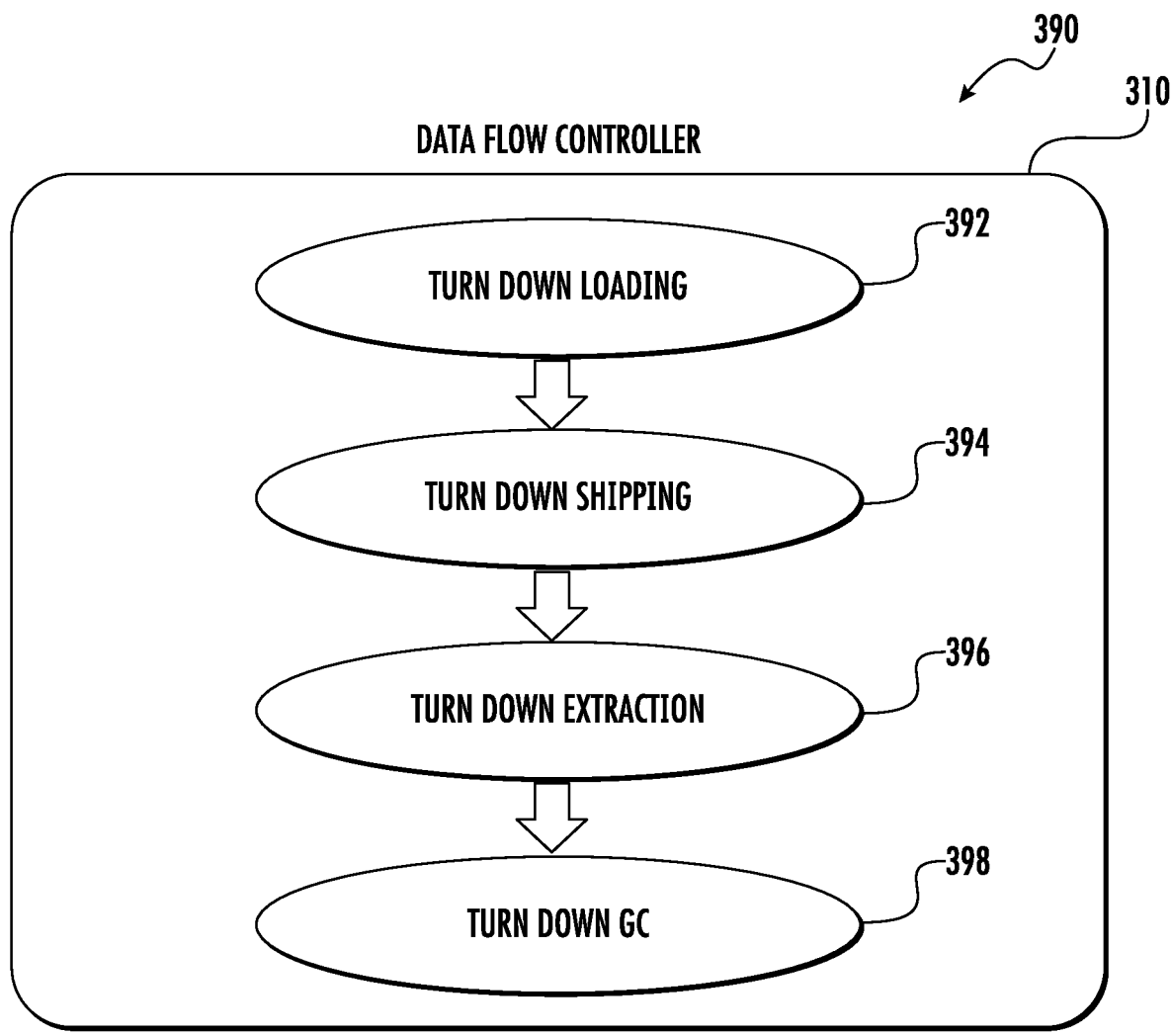

FIG. 3G is an example turn down operation 390 of a retired data flow operation, according to example embodiments of the present disclosure. In some instances, turning down a retired data flow can be easier than turning up a new data flow. The reason is that the planning layer does not need to check the resource and generate the configurations of each component. FIG. 3G shows the steps for turning down a retired data flow. In detail, After no queries for the retired data flow, the DFC component 310 can turn down the loading tasks at 392. For framework$_{local}$, remove the data flow from the management task. Then the management task sends the RPC to the loading task to clean the data from the loading task. For framework$_{remote}$, remove the data flow from the management task. Then the management task sends the RPC to the loading task to clean the data from the loading task. If the loading task only loaded this retired data flow, safely turn down the loading task. Otherwise, keep it for other data flows. At 394, the DFC component 310 can turn down the shipping tasks for this retired data flow. At 396, the DFC component 310 can turn down the extraction tasks for this retired data flow. At 398, the DFC component 310 can turn down GC policy for this retirement data flow since all the components are cleaned.

Example Methods

FIG. 4 depicts a flow chart diagram of an example method for generating replication data from a data source to be stored in a target location according to example embodiments of the present disclosure. Although FIG. 4 depicts steps performed in a particular order for purposes of illustration and discussion, the methods of the present disclosure are not limited to the particularly illustrated order or arrangement. The various steps of method 400 can be omitted, rearranged, combined, and/or adapted in various ways without deviating from the scope of the present disclosure.

At 402, a computing system can receive, from a client device, client requirements (e.g., performance requirements) associated with a dataflow from the data source to the target location. The client requirements can include an expected data freshness value and/or an expected data query latency value. In some instances, the client requirements can include a query function and/or a number of queries per second value.

At 404, the computing system can process the expected data freshness value with one or more machine-learned models to generate an extraction framework for extracting data from the data source.

At 406, the computing system can process the expected data query latency value with the one or more machine-learned models to generate a loading framework for loading data to the target location.

In some instances, the computing system can access training data associated with a plurality of existing data flow setups. The one or more machine-learned models utilized at steps 404 and 406 can be trained using the training data.

At 408, the computing system can copy the replication data from the data source to the target location based on the extraction framework and the loading framework.

In some instances, where an extraction task is extracting data from the data store and a loading task is loading data to the target location, the computing system can determine a file interface between the extraction task and the loading task based on the extraction framework and the loading framework. Additionally, the file interface can be further determined based on a number of extraction tasks, a number of loading tasks, and a function associated with extracting data from the data source.

In some instances, the computing system can determine, using the one or more machine-learned model, a number of split data files. Additionally, the computing system can shard the data being extracted from the data store into the number of split data files.

In some instances, the computing system can calculate a performance metric during the copying of the replication data. Additionally, the computing system can modify a parameter in the extraction framework or a parameter in the loading metric to improve the performance metric.

In some instances, the computing system can calculate a minimum resource value for copying the replication data from the data source to the target location based on the extraction framework and the loading framework. Additionally, the computing system can determine that the minimum resource value is below the available resource allocation. Moreover, the computing system can transmit a request to the client device to allocate additional resources based on the determination that the minimum resource value is below the available resource allocation.

Example Devices and Systems

Figure 5A:
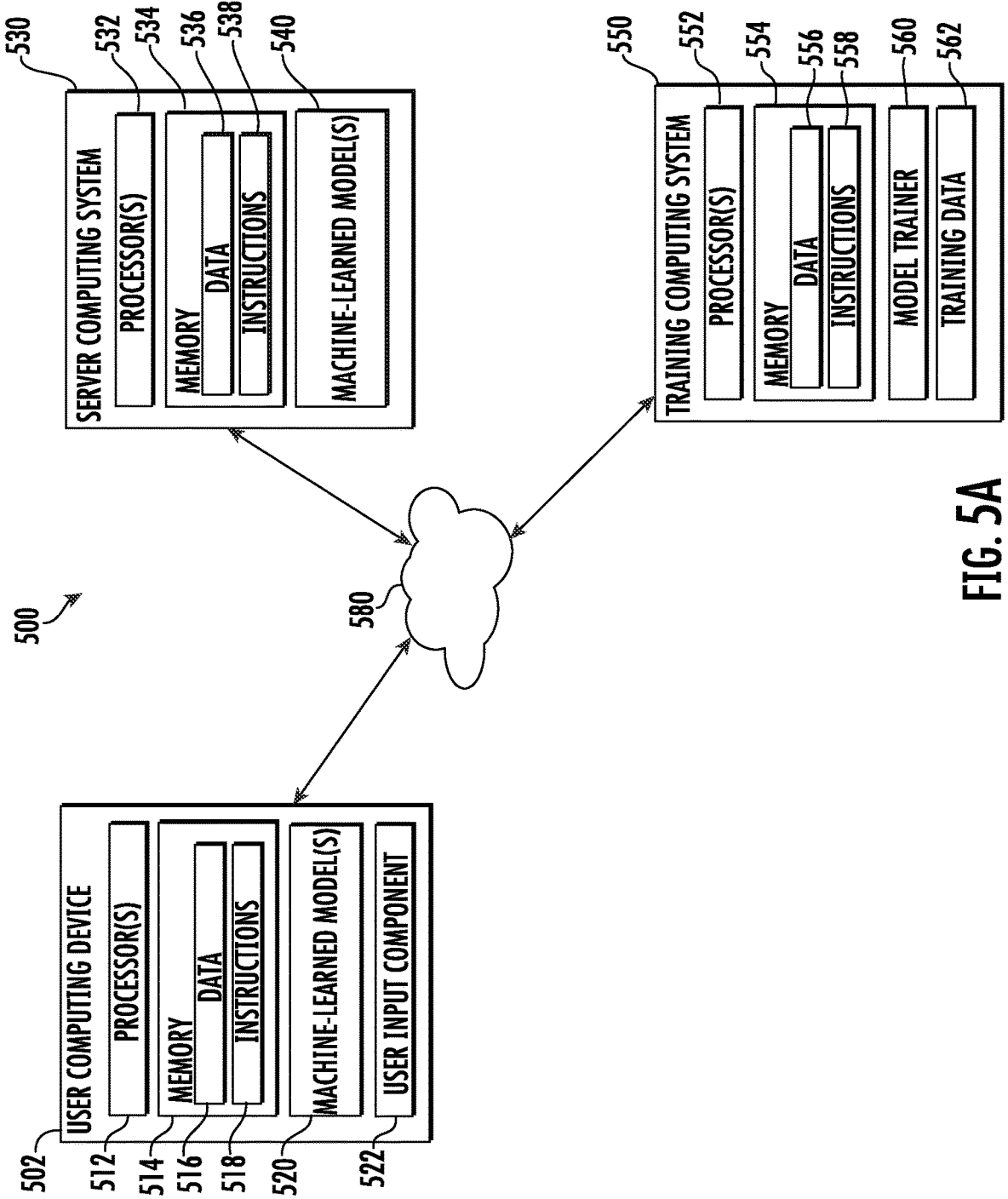
FIGS. 5A-C depict block diagrams of an example computing system that performs data replication according to example embodiments of the present disclosure.

FIG. 5A depicts a block diagram of an example computing system 500 that performs data replication according to example embodiments of the present disclosure. The system 500 includes a user computing device 502, a server computing system 530, and a training computing system 550 that are communicatively coupled over a network 580.

The user computing device 502 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 502 includes one or more processors 512 and a memory 514. The one or more processors 512 can be any suitable processing device (e.g., a processor core, a microprocessor, an ASIC, an FPGA, a controller, a microcontroller, etc.) and can be one processor or a plurality of processors that are operatively connected. The memory 514 can include one or more non-transitory computer-readable storage media, such as RAM, ROM, EEPROM, EPROM, flash memory devices, magnetic disks, etc., and combinations thereof. The memory 514 can store data 516 and instructions 518 which are executed by the processor 512 to cause the user computing device 502 to perform operations.

In some implementations, the user computing device 502 can store or include one or more machine-learned models 520. For example, the machine-learned models 520 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 520 are discussed with reference to FIGS. 1A-4.

In some implementations, the one or more machine-learned models 520 can be received from the server computing system 530 over network 580, stored in the user computing device memory 514, and then used or otherwise implemented by the one or more processors 512. In some implementations, the user computing device 502 can implement multiple parallel instances of a single machine-learned model 520 (e.g., to perform parallel data processing operations across multiple instances of different servers).

Additionally or alternatively, one or more machine-learned models 540 can be included in or otherwise stored and implemented by the server computing system 530 that communicates with the user computing device 502 according to a client-server relationship. For example, the machine-learned models 540 can be implemented by the server computing system 540 as a portion of a web service (e.g., a content serving service). Thus, one or more models 520 can be stored and implemented at the user computing device 502 and/or one or more models 540 can be stored and implemented at the server computing system 530.

The user computing device 502 can also include one or more user input components 522 that receives user input. For example, the user input component 522 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 530 includes one or more processors 532 and a memory 534. The one or more processors 532 can be any suitable processing device (e.g., a processor core, a microprocessor, an ASIC, an FPGA, a controller, a microcontroller, etc.) and can be one processor or a plurality of processors that are operatively connected. The memory 534 can include one or more non-transitory computer-readable storage media, such as RAM, ROM, EEPROM, EPROM, flash memory devices, magnetic disks, etc., and combinations thereof. The memory 534 can store data 536 and instructions 538 which are executed by the processor 532 to cause the server computing system 530 to perform operations.

In some implementations, the server computing system 530 includes or is otherwise implemented by one or more server computing devices. In instances in which the server computing system 530 includes plural server computing devices, such server computing devices can operate according to sequential computing architectures, parallel computing architectures, or some combination thereof.

As described above, the server computing system 530 can store or otherwise include one or more machine-learned models 540. For example, the models 540 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 540 are discussed with reference to FIGS. 1A-4.

The user computing device 502 and/or the server computing system 530 can train the models 520 and/or 540 via interaction with the training computing system 550 that is communicatively coupled over the network 580. The training computing system 550 can be separate from the server computing system 530 or can be a portion of the server computing system 530.

The training computing system 550 includes one or more processors 552 and a memory 554. The one or more processors 552 can be any suitable processing device (e.g., a processor core, a microprocessor, an ASIC, an FPGA, a controller, a microcontroller, etc.) and can be one processor or a plurality of processors that are operatively connected. The memory 554 can include one or more non-transitory computer-readable storage media, such as RAM, ROM, EEPROM, EPROM, flash memory devices, magnetic disks, etc., and combinations thereof. The memory 554 can store data 556 and instructions 558 which are executed by the processor 552 to cause the training computing system 550 to perform operations. In some implementations, the training computing system 550 includes or is otherwise implemented by one or more server computing devices.

The training computing system 550 can include a model trainer 560 that trains the machine-learned models 520 and/or 540 stored at the user computing device 502 and/or the server computing system 530 using various training or learning techniques, such as, for example, backwards propagation of errors. For example, a loss function can be back propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 560 can perform a number of generalization techniques (e.g., weight decays, dropouts, etc.) to improve the generalization capability of the models being trained.

In particular, the model trainer 560 can train the OVERALL models 520 and/or 540 based on a set of training data 562. The training data 562 can include, for example, training data flow pool 352.

In some implementations, if the user has provided consent, the training examples can be provided by the user computing device 502. Thus, in such implementations, the model 520 provided to the user computing device 502 can be trained by the training computing system 550 on user-specific data received from the user computing device 502. In some instances, this process can be referred to as personalizing the model.

The model trainer 560 includes computer logic utilized to provide desired functionality. The model trainer 560 can be implemented in hardware, firmware, and/or software controlling a general purpose processor. For example, in some implementations, the model trainer 560 includes program files stored on a storage device, loaded into a memory and executed by one or more processors. In other implementations, the model trainer 560 includes one or more sets of computer-executable instructions that are stored in a tangible computer-readable storage medium such as RAM, hard disk, or optical or magnetic media.

The network 580 can be any type of communications network, such as a local area network (e.g., intranet), wide area network (e.g., Internet), or some combination thereof and can include any number of wired or wireless links. In general, communication over the network 580 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

FIG. 5A illustrates one example computing system that can be used to implement the present disclosure. Other computing systems can be used as well. For example, in some implementations, the user computing device 502 can include the model trainer 560 and the training dataset 562. In such implementations, the models 520 can be both trained and used locally at the user computing device 502. In some of such implementations, the user computing device 502 can implement the model trainer 560 to personalize the models 520 based on user-specific data.

Figure 5B:
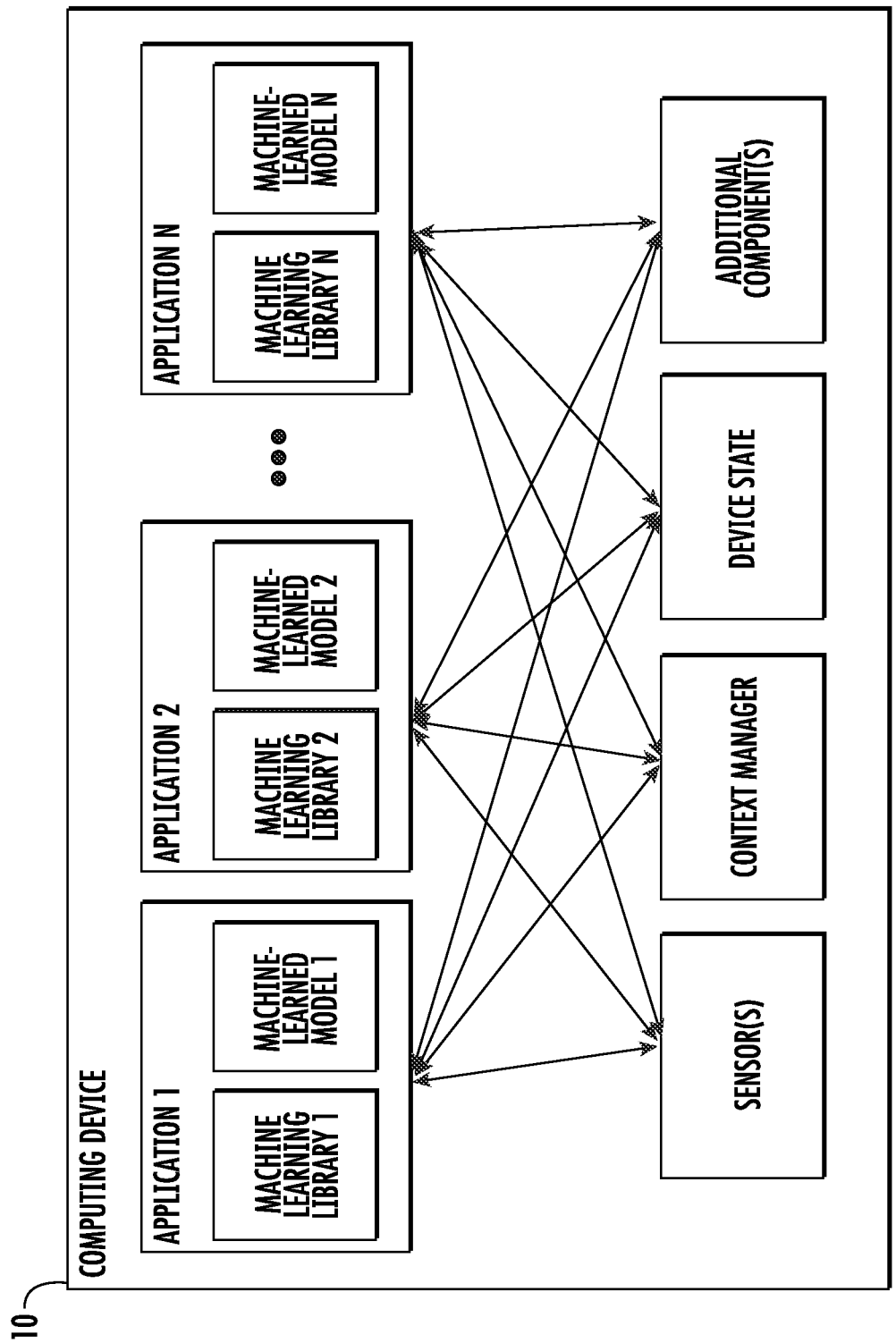

FIG. 5B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 5B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 5C:
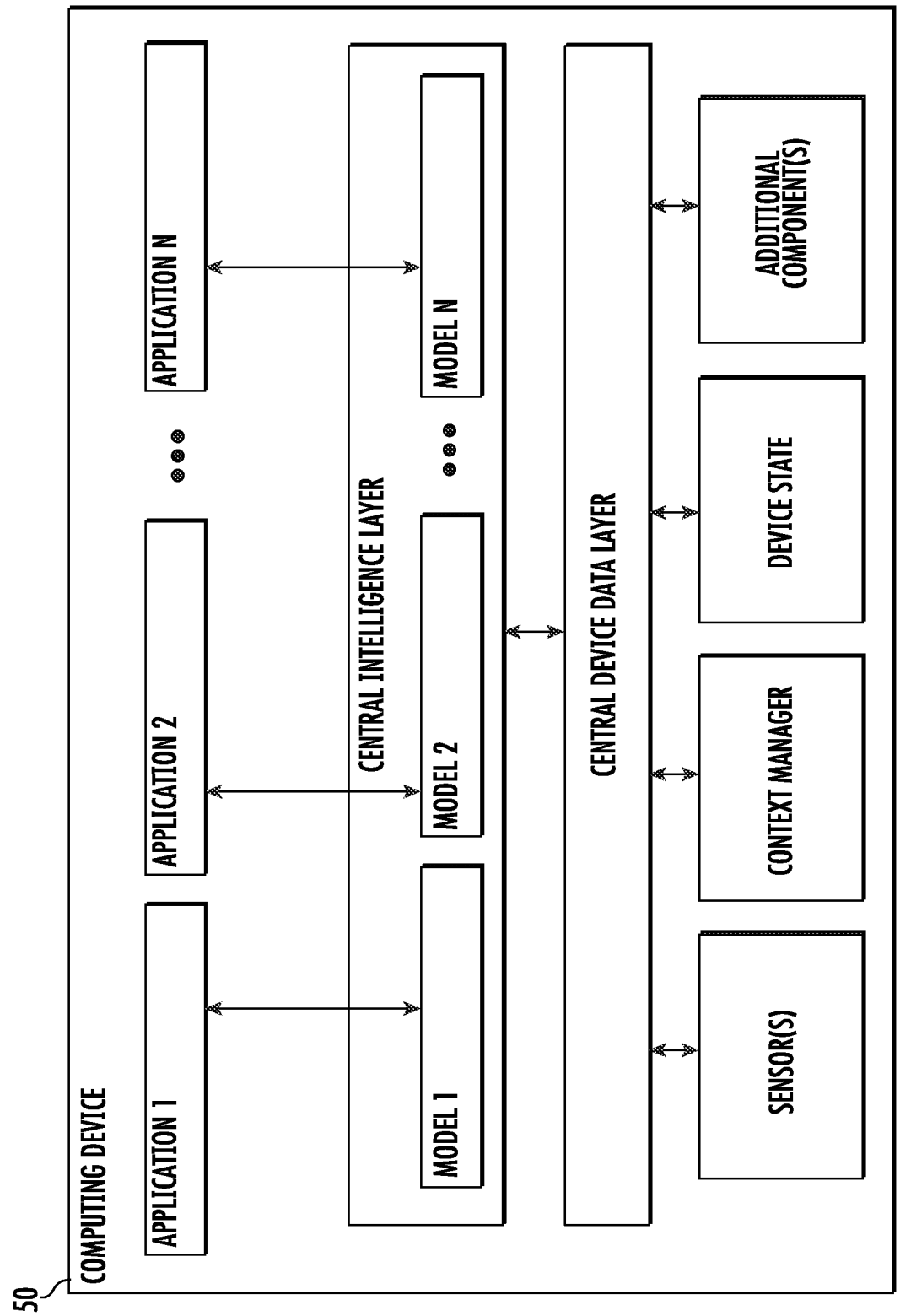

FIG. 5C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 5C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 5C, the central device data layer can communicate with a number of other components of the computing device, such as, for example, one or more sensors, a context manager, a device state component, and/or additional components. In some implementations, the central device data layer can communicate with each device component using an API (e.g., a private API).

Although an example processing system has been described in FIGS. 5A-C, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Additional Disclosure

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination. Additionally, features described with respect to particular headings may be utilized with respect to and/or in combination with illustrative implementations described under other headings; headings, where provided, are included solely for the purpose of readability, and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computer-implemented method for generating replication data from a data source to be stored in a target location, the method comprising:
    receiving, from a client device, client requirements associated with a dataflow from the data source to the target location, the client requirements having an expected data freshness value and an expected data query latency value;
    processing the expected data freshness value with one or more machine-learned models to generate an extraction framework for extracting data from the data source;
    determining, using the one or more machine-learned models, a number of split data files;
    sharding data being extracted from the data store into the number of split data files;
    processing the expected data query latency value with the one or more machine-learned models to generate a loading framework for loading data to the target location; and
    copying the replication data from the data source to the target location based on the extraction framework and the loading framework.

2. The method of claim 1, further comprising:
    accessing training data associated with a plurality of existing data flow setups; and
    wherein the one or more machine-learned models is trained using the training data.

3. The method of claim 1, wherein an extraction task is extracting data from the data store, and wherein a loading task is loading data to the target location, the method further comprising:
    determining a file interface between the extraction task and the loading task based on the extraction framework and the loading framework.

4. The method of claim 3, wherein the file interface is further determined based on a number of extraction tasks, a number of loading tasks, and a function associated with extracting data from the data source.

5. The method of claim 1, further comprising:
calculating a performance metric during the copying of the replication data; and
modifying a parameter in the extraction framework or a parameter in the loading metric to improve the performance metric.

6. The method of claim 1, further comprising:
calculating a minimum resource value for copying the replication data from the data source to the target location based on the extraction framework and the loading framework;
determining that the minimum resource value is below an available resource allocation; and
transmitting a request to the client device to allocate additional resources based on the determination that the minimum resource value is below the available resource allocation.

7. The method of claim 1, wherein the client requirements include a query function.

8. The method of claim 1, wherein the client requirements include a number of queries per second value.

9. The method of claim 1, wherein the extraction framework is extracting a snapshot of the data source at a specific period of time.

10. The method of claim 1, wherein the extraction framework is extracting a snapshot of the data source at a specific period of time and data associated with incremental changes since the specific period of time.

11. The method of claim 1, wherein the loading framework is a local loading operation, wherein the local loading operation has a loading and a query on a similar task.

12. The method of claim 1, wherein the loading framework is a remote loading operation, wherein the remote loading operation has separate loading and query tasks.

13. A computing system for generating replication data from a data source to be stored in a target location, comprising:
one or more processors; and
one or more non-transitory computer-readable media that collectively store;
one or more machine-learned models, wherein the one or more machine-learned models are configured to generate an extraction framework and a loading framework; and
instructions that, when executed by the one or more processors, cause the computing system to perform operations, the operations comprising:
receiving, from a client device, client requirements associated with a dataflow from the data source to the target location, the client requirements having an expected data freshness value and an expected data query latency value;
processing the expected data freshness value with the one or more machine-learned models to generate the extraction framework for extracting data from the data source;
determining, using the one or more machine-learned models, a number of split data files;
sharding data being extracted from the data store into the number of split data files;
processing the expected data query latency value with the one or more machine-learned models to generate the loading framework for loading data to the target location; and
copying the replication data from the data source to the target location based on the extraction framework and the loading framework.

14. The computing system of claim 13, the operations further comprising:
accessing training data associated with a plurality of existing data flow setups; and
wherein the one or more machine-learned models are trained using the training data.

15. The computing system of claim 13, wherein an extraction task is extracting data from the data store, and wherein a loading task is loading data to the target location, the operations further comprising:
determining a file interface between the extraction task and the loading task based on the extraction framework, the loading framework, a number of extraction tasks, a number of loading tasks, and a function associated with extracting data from the data source.

16. The computing system of claim 13, the operations further comprising:
calculating a performance metric during the copying of the replication data;
modifying a parameter in the extraction framework or a parameter in the loading metric to improve the performance metric.

17. The computing system of claim 13, the operations further comprising:
calculating a minimum resource value for copying the replication data from the data source to the target location based on the extraction framework and the loading framework;
determining that the minimum resource value is below an available resource allocation; and
transmitting a request to the client device to allocate additional resources based on the determination that the minimum resource value is below the available resource allocation.

18. One or more non-transitory computer-readable media comprising instructions that when executed by one or more computing devices cause the one or more computing devices to perform operations comprising:
receiving, from a client device, client requirements associated with a dataflow from a data source to a target location, the client requirements having an expected data freshness value and an expected data query latency value;
processing the expected data freshness value with one or more machine-learned models to generate an extraction framework for extracting data from the data source;
determining, using the one or more machine-learned models, a number of split data files;
sharding data being extracted from the data store into the number of split data files;
processing the expected data query latency value with the one or more machine-learned models to generate a loading framework for loading data to the target location; and
copying replication data from the data source to the target location based on the extraction framework and the loading framework.

19. A computer-implemented method for generating replication data from a data source to be stored in a target location, the method comprising:
receiving, from a client device, client requirements associated with a dataflow from the data source to the target location, the client requirements having an expected data freshness value and an expected data query latency value;

processing the expected data freshness value with one or more machine-learned models to generate an extraction framework for extracting data from the data source, wherein an extraction task is extracting data from the data store;

processing the expected data query latency value with the one or more machine-learned models to generate a loading framework for loading data to the target location, wherein a loading task is loading data to the target location;

determining a file interface between the extraction task and the loading task based on the extraction framework and the loading framework, wherein the file interface is further determined based on a number of extraction tasks, a number of loading tasks, and a function associated with extracting data from the data source; and copying the replication data from the data source to the target location based on the extraction framework and the loading framework.

20. A computer-implemented method for generating replication data from a data source to be stored in a target location, the method comprising:

receiving, from a client device, client requirements associated with a dataflow from the data source to the target location, the client requirements having an expected data freshness value and an expected data query latency value;

processing the expected data freshness value with one or more machine-learned models to generate an extraction framework for extracting data from the data source;

processing the expected data query latency value with the one or more machine-learned models to generate a loading framework for loading data to the target location, wherein the loading framework is a local loading operation, and wherein the local loading operation has a loading and a query on a similar task; and copying the replication data from the data source to the target location based on the extraction framework and the loading framework.

21. A computer-implemented method for generating replication data from a data source to be stored in a target location, the method comprising:

receiving, from a client device, client requirements associated with a dataflow from the data source to the target location, the client requirements having an expected data freshness value and an expected data query latency value;

processing the expected data freshness value with one or more machine-learned models to generate an extraction framework for extracting data from the data source;

processing the expected data query latency value with the one or more machine-learned models to generate a loading framework for loading data to the target location, wherein the loading framework is a remote loading operation, and wherein the remote loading operation has separate loading and query tasks; and copying the replication data from the data source to the target location based on the extraction framework and the loading framework.

* * * * *